United States Patent
Kazi et al.

(10) Patent No.: US 10,089,036 B2
(45) Date of Patent: Oct. 2, 2018

(54) MIGRATING DATA IN A DISTRIBUTED STORAGE NETWORK

(71) Applicant: International Business Machines Corporation, Armonk, NY (US)

(72) Inventors: Asimuddin Kazi, Naperville, IL (US); Joseph M. Kaczmarek, Chicago, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/827,073

(22) Filed: Nov. 30, 2017

(65) Prior Publication Data

US 2018/0081586 A1    Mar. 22, 2018

Related U.S. Application Data

(63) Continuation-in-part of application No. 14/721,838, filed on May 26, 2015, now Pat. No. 9,841,925.
(Continued)

(51) Int. Cl.
*G06F 15/167* (2006.01)
*G06F 3/06* (2006.01)
*H04L 29/08* (2006.01)

(52) U.S. Cl.
CPC .......... *G06F 3/0647* (2013.01); *G06F 3/067* (2013.01); *G06F 3/0653* (2013.01); *H04L 67/1097* (2013.01); *G06F 3/0604* (2013.01)

(58) Field of Classification Search
CPC .... G06F 3/0604; G06F 3/0647; G06F 3/0653; G06F 3/067; H04L 67/1097
(Continued)

(56) References Cited

U.S. PATENT DOCUMENTS 4,092,732 A    5/1978  Ouchi
5,454,101 A    9/1995  Mackay et al.
(Continued)

OTHER PUBLICATIONS

Shamir; How to Share a Secret; Communications of the ACM; vol. 22, No. 11; Nov. 1979; pp. 612-613.
(Continued)

*Primary Examiner* — Phuoc Nguyen
(74) *Attorney, Agent, or Firm* — Garlick & Markison; Timothy W. Markison; Kelly H. Hale

(57) ABSTRACT

A method begins by a processing modules of a storage unit (SU) of a dispersed storage network (DSN) determining to migrate a set of encoded data slices from the first storage format to a second storage format. The method continues with the SU selecting the second storage format for the set of EDSs and selecting a second DSN memory configured to store the set of EDSs based on the second storage format. The method continues with the SU determining a first migration rate and migrating a first subset of the set of EDSs from the first DSN memory to the second DSN memory. The method continues with the SU monitoring activity associated with the DSN memory, selecting a second migration rate based on the activity associated with the at least one of the first DSN memory or the second DSN memory, and migrating a second subset of the set of EDSs based on the second migration rate.

20 Claims, 26 Drawing Sheets

Related U.S. Application Data

(60) Provisional application No. 62/031,342, filed on Jul. 31, 2014.

(58) Field of Classification Search
USPC .................................. 709/212, 213, 224, 238
See application file for complete search history.

(56) References Cited

U.S. PATENT DOCUMENTS

| | | |
|---|---|---|
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 8,275,744 B2 | 9/2012 | Baptist et al. |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula |
| 2005/0132070 A1 | 6/2005 | Redlich et al. |
| 2005/0144382 A1 | 6/2005 | Schmisseur |
| 2005/0229069 A1 | 10/2005 | Hassner et al. |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0106972 A1 | 5/2011 | Grube et al. |
| 2012/0054556 A1* | 3/2012 | Grube ................... G06F 3/0619 714/42 |
| 2012/0089809 A1 | 4/2012 | Resch et al. |
| 2012/0311068 A1 | 12/2012 | Gladwin et al. |
| 2013/0110962 A1 | 5/2013 | Grube et al. |
| 2013/0111166 A1 | 5/2013 | Resch et al. |
| 2013/0151670 A1 | 6/2013 | Leggette et al. |
| 2013/0275480 A1 | 10/2013 | Dhuse et al. |
| 2013/0290482 A1 | 10/2013 | Leggette |
| 2014/0330921 A1 | 11/2014 | Storm et al. |
| 2015/0381731 A1* | 12/2015 | Grube ................. H04L 67/1097 709/224 |
| 2018/0124176 A1* | 5/2018 | McShane ............ G06F 11/1092 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

(56) References Cited

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

MIGRATING DATA IN A DISTRIBUTED STORAGE NETWORK

CROSS REFERENCE TO RELATED PATENTS

The present U.S. Utility patent application claims priority pursuant to 35 U.S.C. § 120 as a continuation-in-part of U.S. Utility application Ser. No. 14/721,838, entitled "ADJUSTING TIMING OF STORING DATA IN A DISPERSED STORAGE NETWORK", filed May 26, 2015, which claims priority pursuant to 35 U.S.C. § 119(e) to U.S. Provisional Application No. 62/031,342, entitled "DISPERSED STORAGE NETWORK STORAGE RETRY MECHANISM", filed Jul. 31, 2014, both of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersed storage of data and distributed task processing of data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

DETAILED DESCRIPTION OF THE INVENTION

Figure 1:
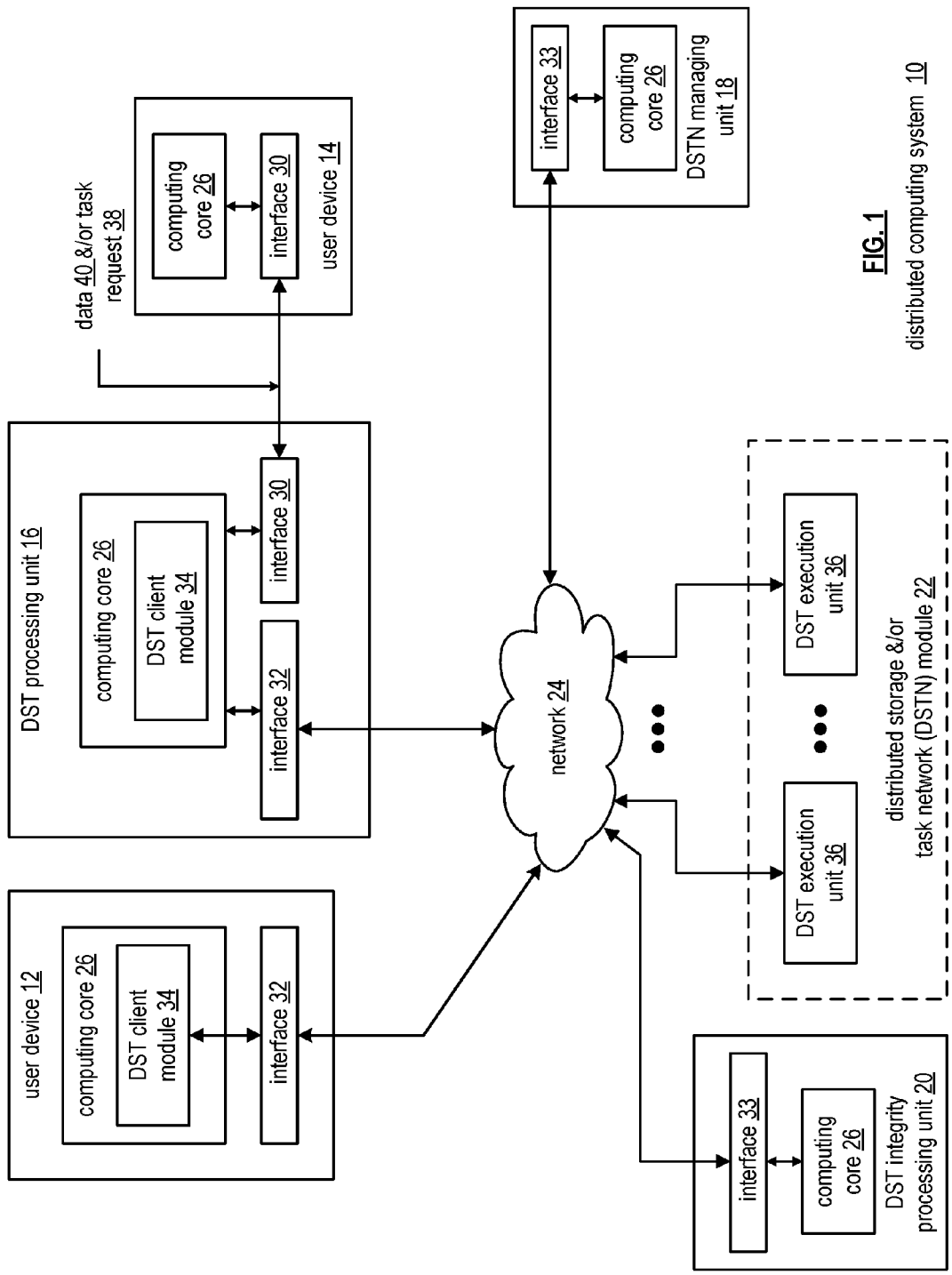
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
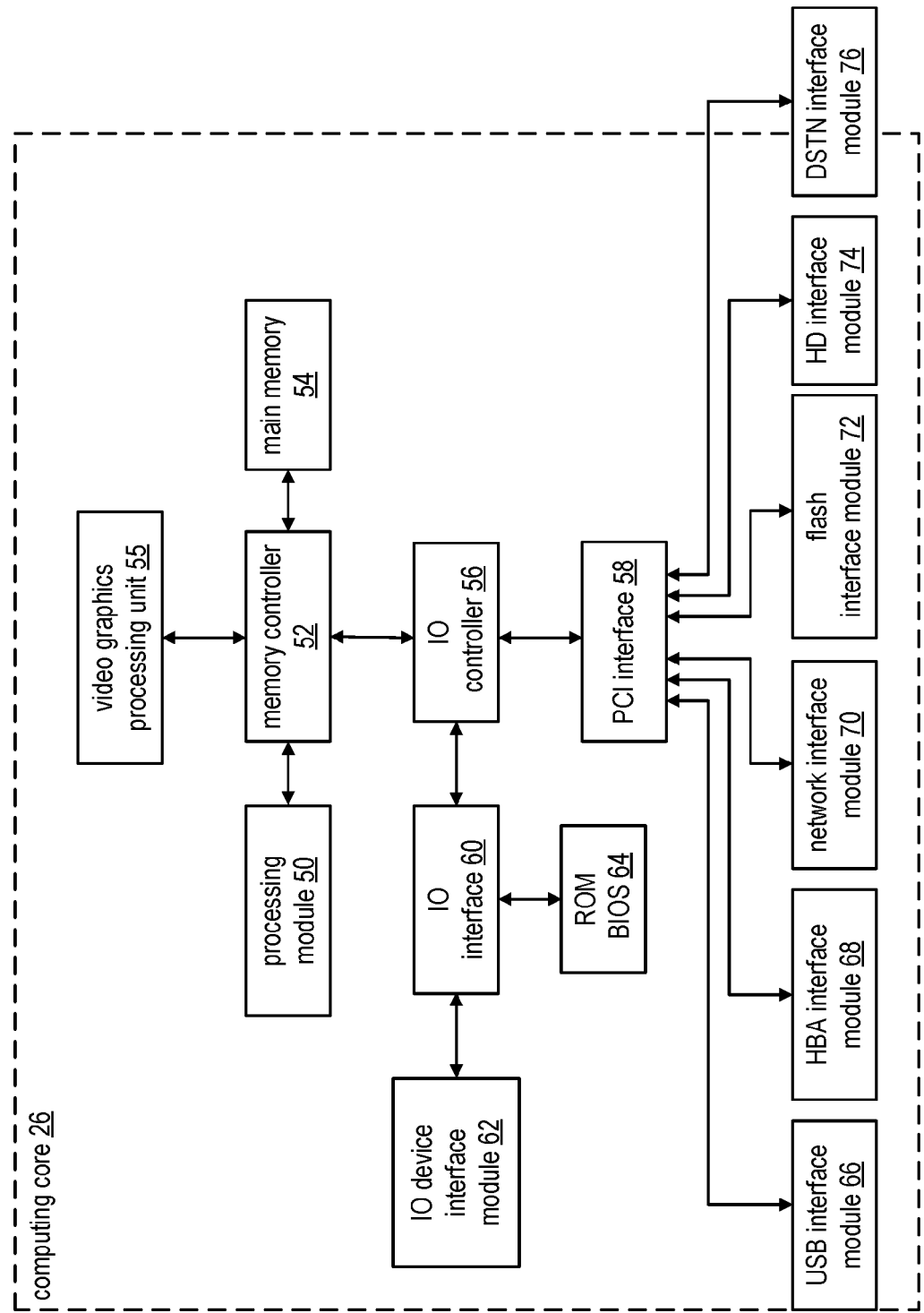
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
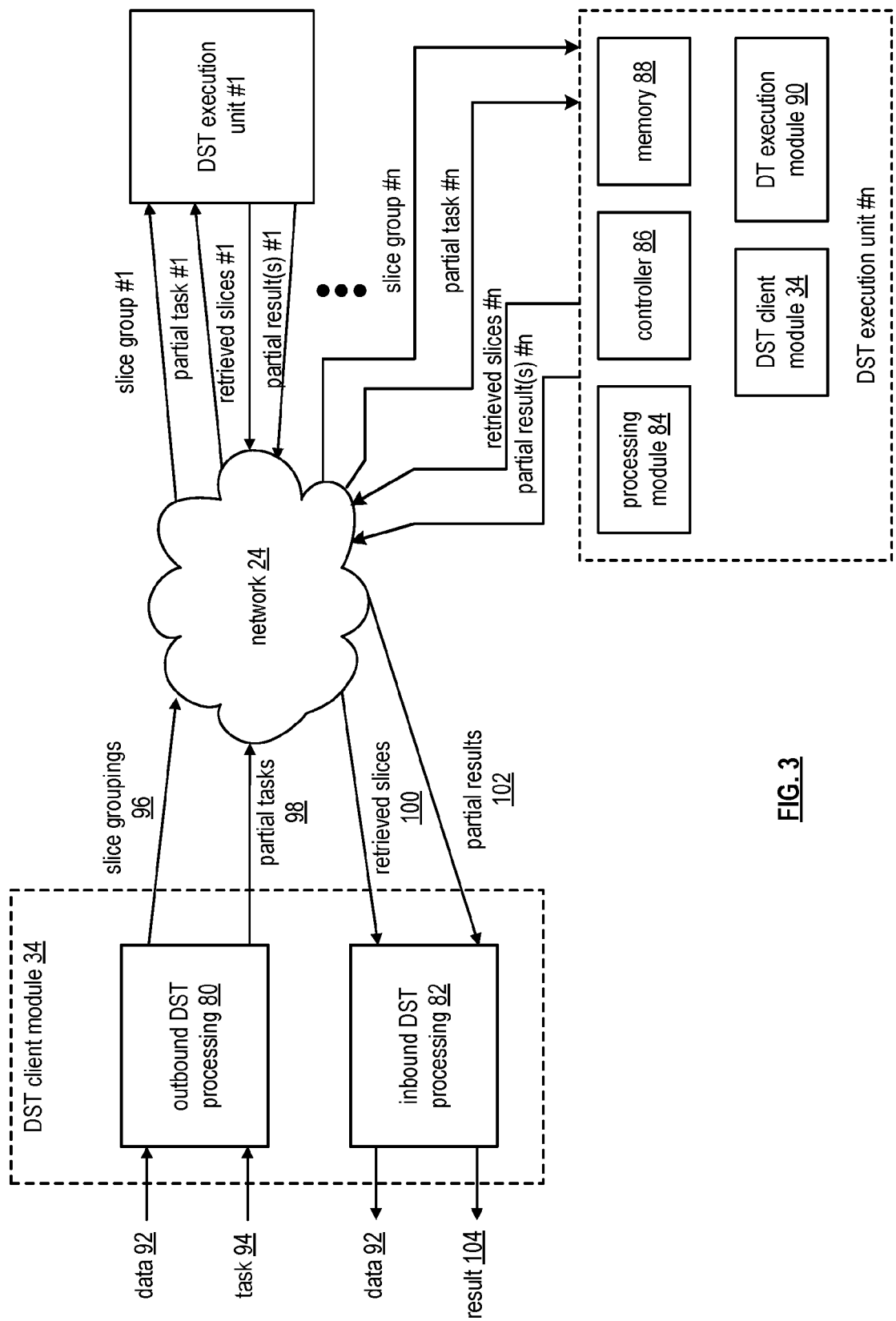
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terabytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terabytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
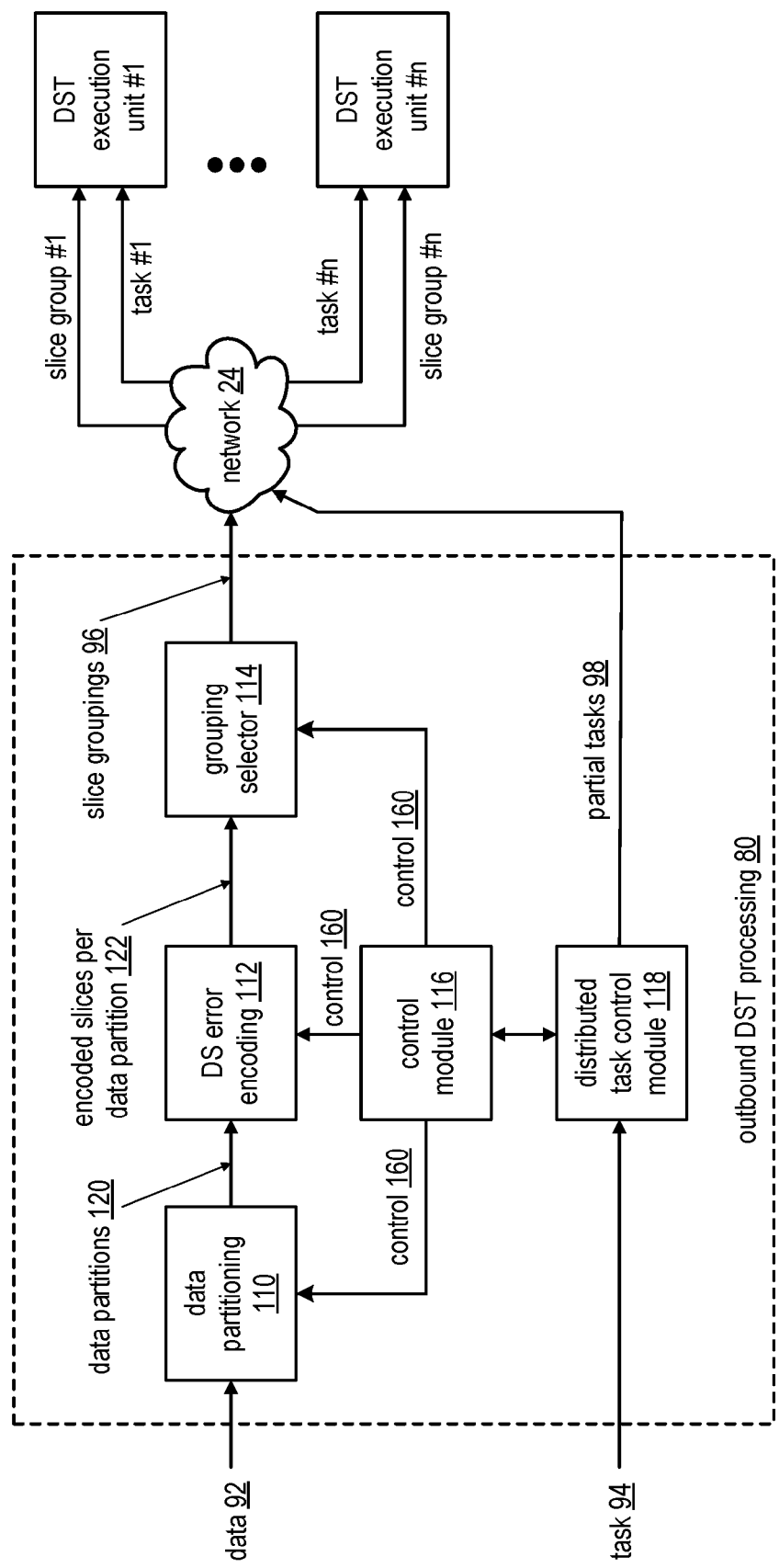
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terabytes) into 100,000 data segments, each being 1 Gigabyte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
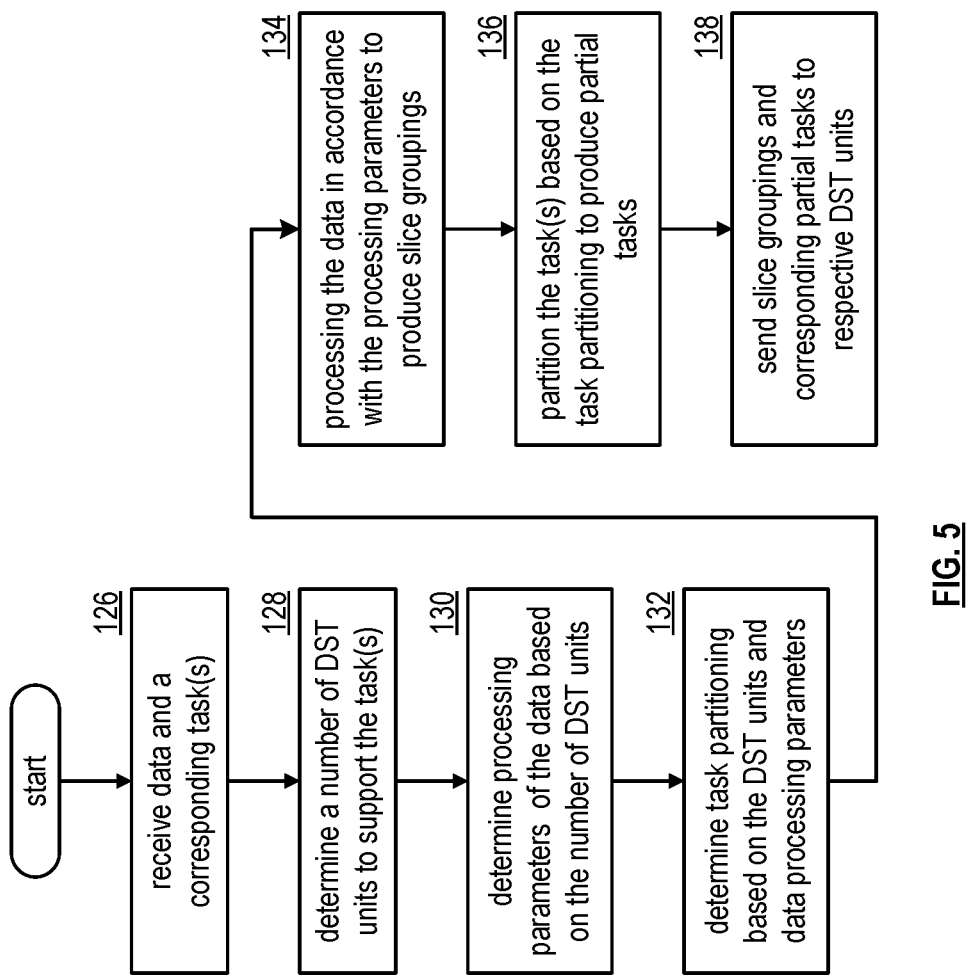
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
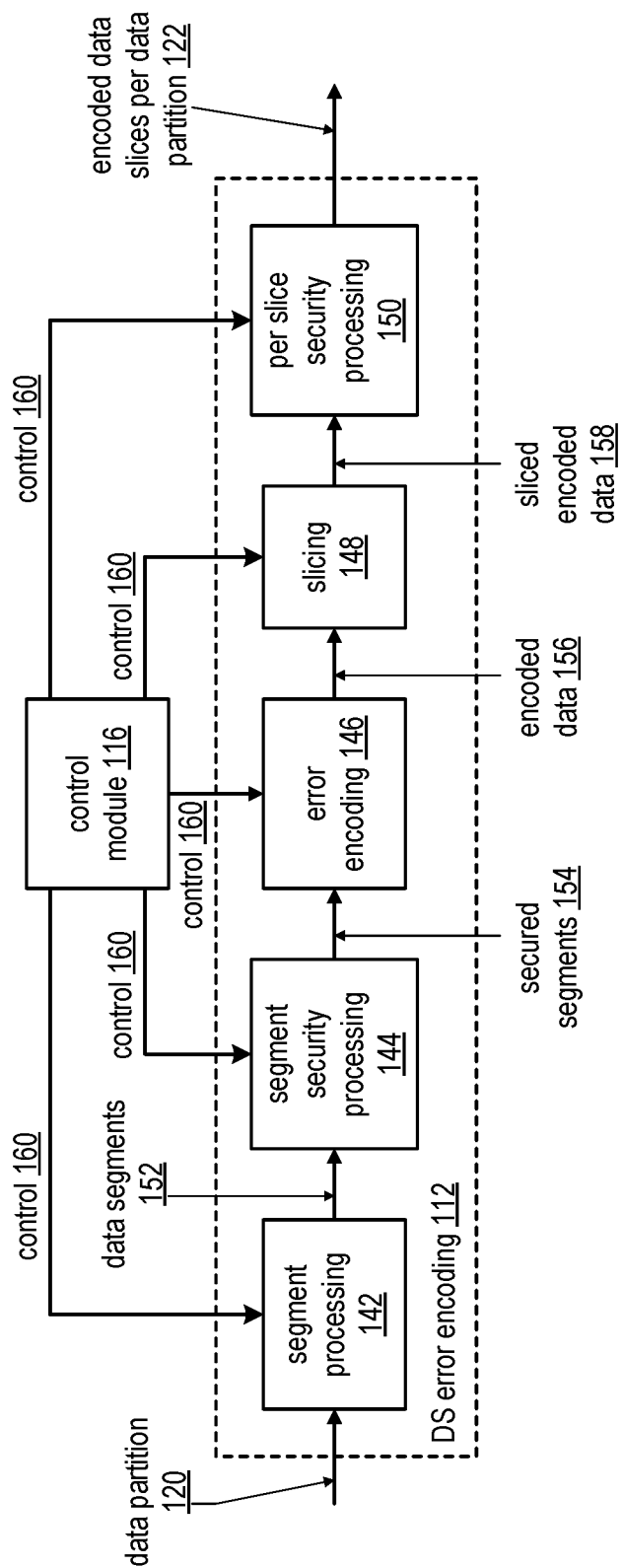
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
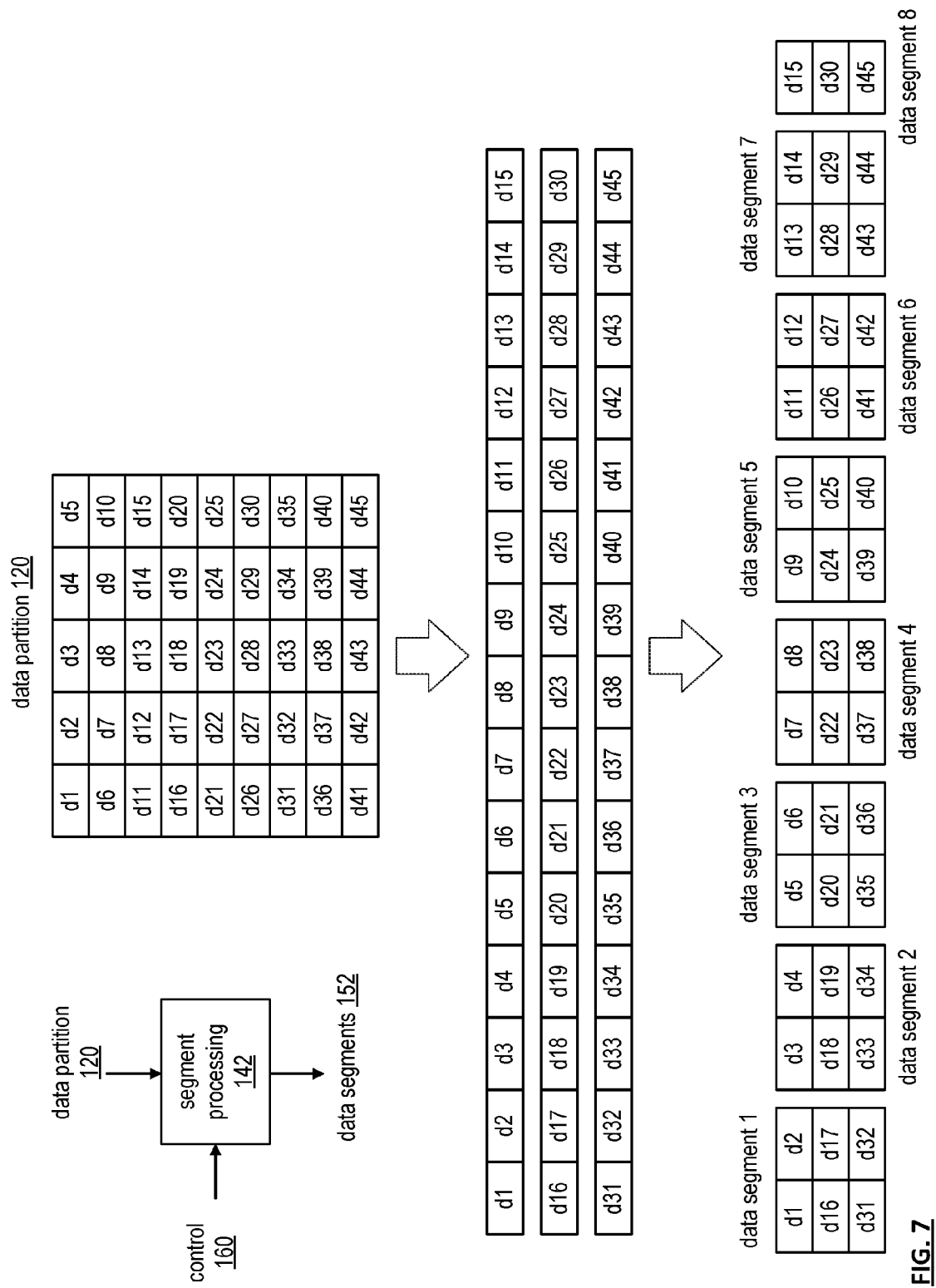
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1-d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8A:
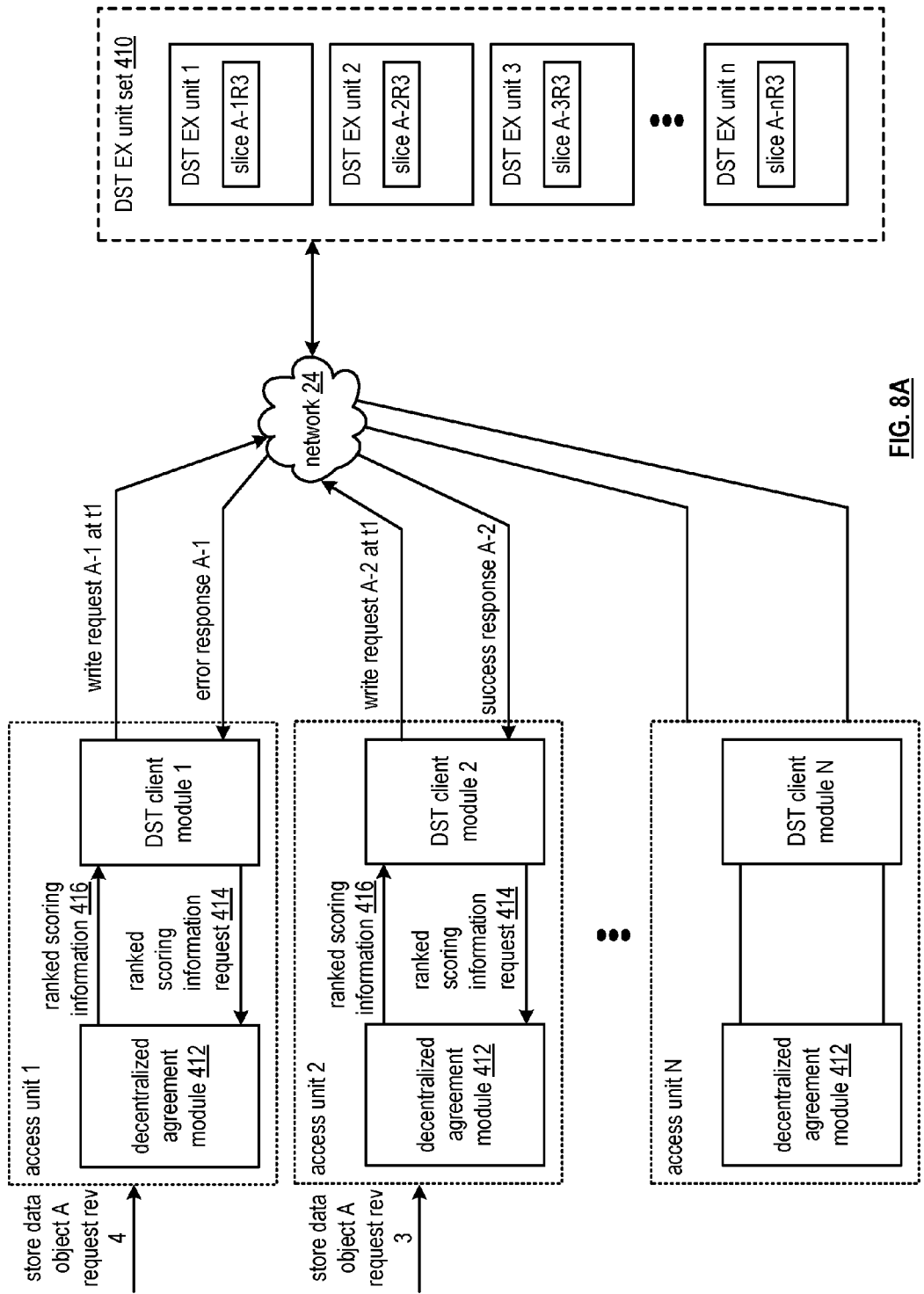
FIGS. 8A and 8C are schematic block diagrams of another embodiment of a dispersed storage network (DSN) in accordance with the present invention.
Figure 8B:
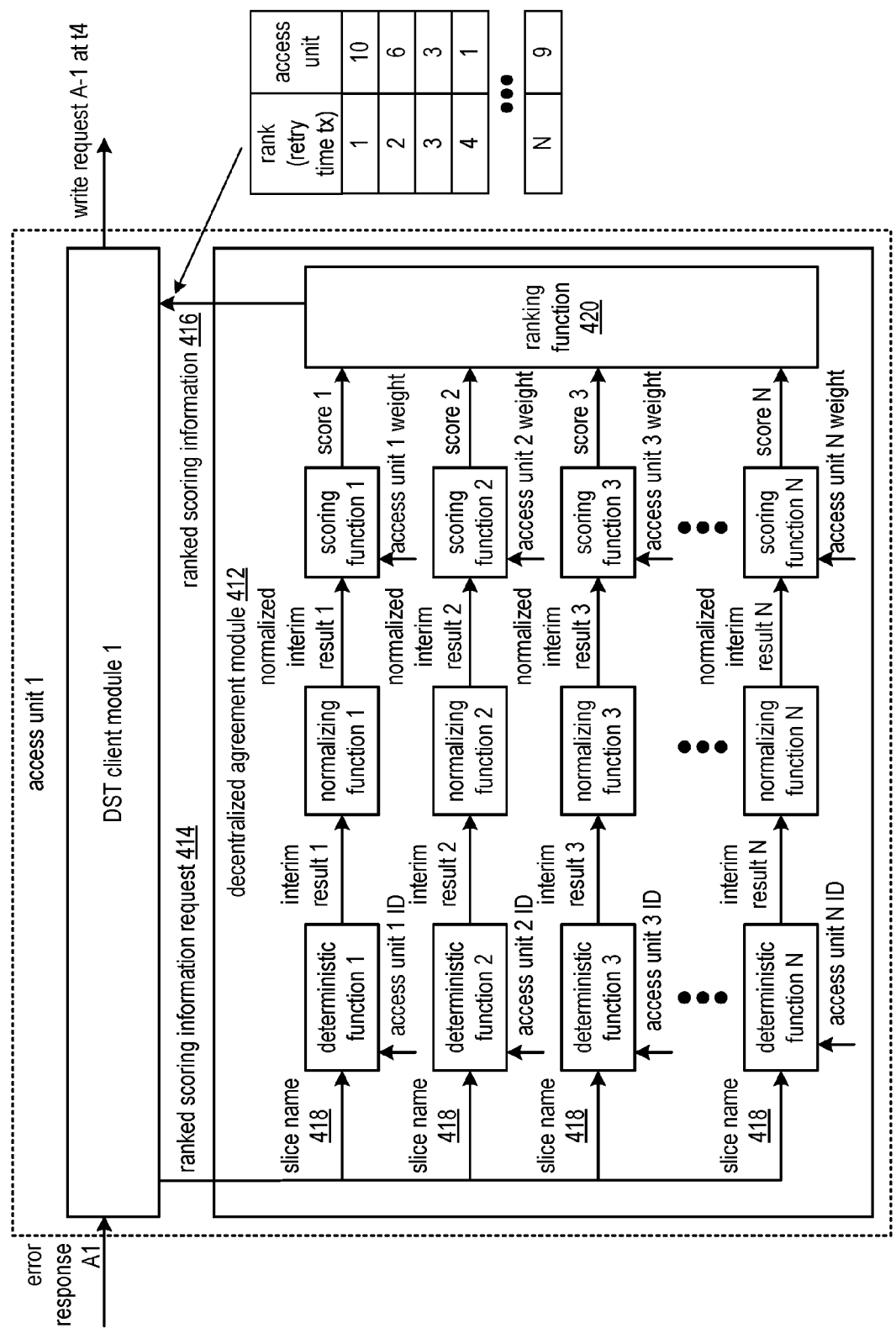
FIG. 8B is a schematic block diagram of an embodiment of an access unit in accordance with the present invention.
Figure 8C:
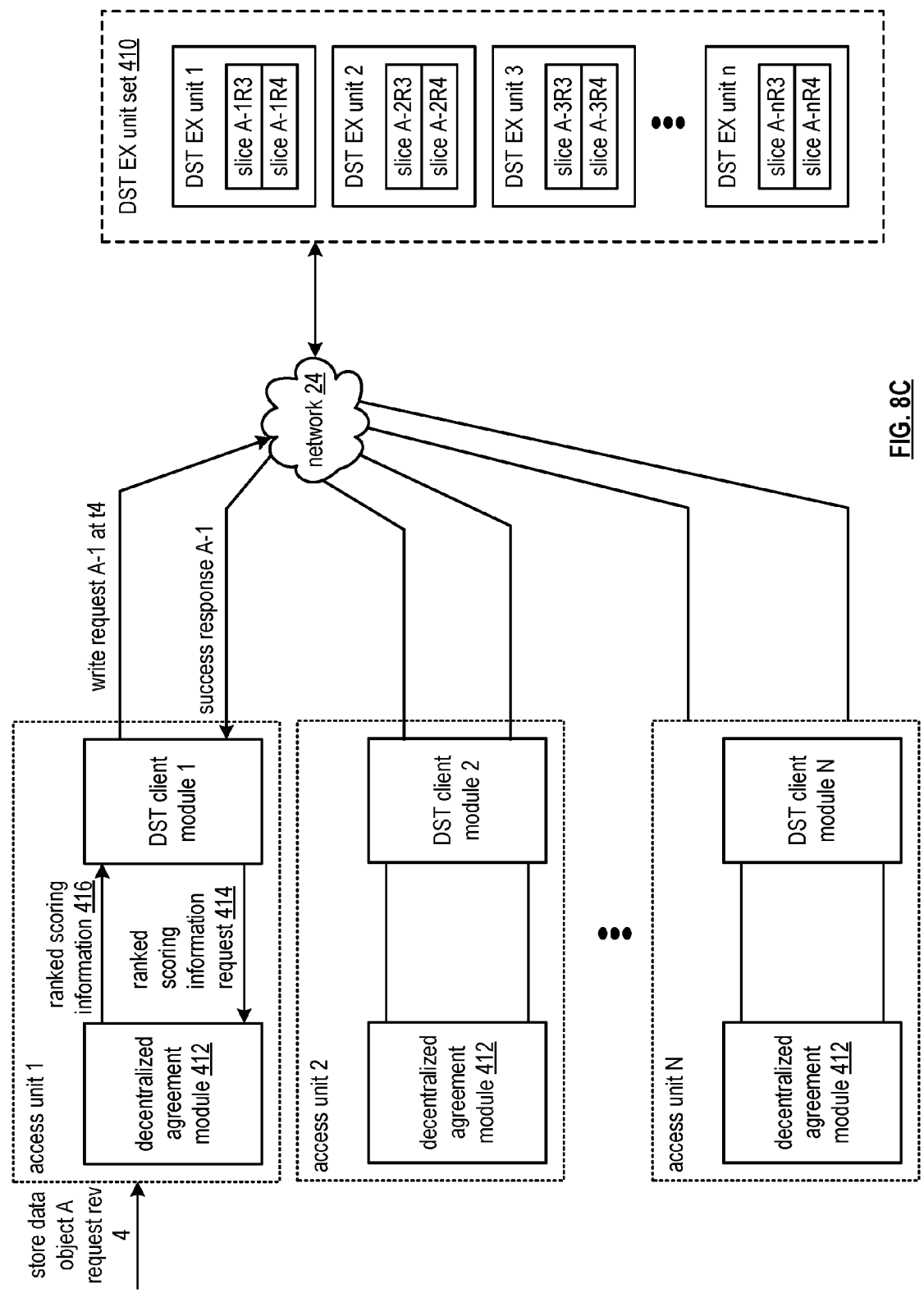

FIGS. 8A and 8C are a schematic block diagram of another embodiment of a dispersed storage network (DSN) that includes a plurality of access units 1-N, the network 24 of FIG. 1, and a distributed storage and task (DST) execution (EX) unit set 410. Each access unit includes a decentralized agreement module 412 and a corresponding DST client module of a plurality of DST client modules 1-N of the plurality of access units 1-N. The decentralized agreement module 412 may be implemented utilizing the decentralized agreement module 350 of FIG. 40A. Each DST client module may be implemented utilizing the DST client module 34 of FIG. 1. Hereafter, each access unit may be interchangeably referred to as a DSN unit and the plurality of access units may be interchangeably referred to as a plurality of DSN units.

The DST execution unit set 410 includes a set of DST execution units 1-n. Each DST execution unit may be implemented utilizing the DST execution unit 36 of FIG. 1. Hereafter, each DST execution unit may be interchangeably referred to as a storage unit and the DST execution unit set 410 may be interchangeably referred to as a set of storage units and/or a DSN memory of the DSN. The DSN functions to adjust timing of storing of data in the DST execution unit set 410, where a data object is divided into a plurality of data segments, each data segment is dispersed storage error encoded to produce a set of encoded data slices of a plurality of sets of encoded data slices, and a plurality of sets of encoded data slices are stored in the DST execution unit set 410.

FIG. 8A illustrates steps of an example of operation of the adjusting of timing of the storing of the data where access units 1-2 received stored data object A requests of revisions 4 and 3 respectively. Each of the DST client modules 1 and 2 dispersed storage error encodes received revisions of the data object A to produce a corresponding at least one set of encoded data slices for storage in the set of DST execution units 1-n and generates a corresponding range of DSN addresses (e.g., at least one set of slice names). Having produced the at least one set of encoded data slices, a DSN unit of the plurality of DSN units sends a write request to DSN memory, where the write request includes the range of DSN addresses. For example, at time=t1, substantially simultaneously, the DST client module 1 sends, via the network 24, a write request A-1 to the set of DST execution units and the DST client module 2 sends a write request A-2 to the set of DST execution units.

Having sent the write request, in response to the write request the DSN unit receives an error message indicating that another DSN unit of the plurality of DSN units has current write permission to the DSN memory to the range of DSN addresses. For example, the DST client module 1 receives, via the network 24, an error response A-1 that includes the error message and DST client module 2 receives, via the network 24, a success response A-2 indicating that the access unit 2 has the current write permission to the DSN memory to the range of DSN addresses (e.g., the corresponding set of slice names).

Having received the error message, the DSN unit (e.g., the access unit 1) performs a scoring function using one or more properties of the range of DSN addresses and one or more properties of each of at least some of the plurality of DSN units to produce a scoring resultant. The one or more properties of the range of DSN addresses includes one of an individual DSN address, at least some DSN addresses in the range of DSN addresses, a source name corresponding to a data object, a set of source names corresponding to a set of data objects, an individual slice name, and a range of slice names. The one or more properties of each of the at least some of the plurality of DSN units includes at least one of a DSN unit identifier and a DSN unit weighting factor.

The performing the scoring function includes obtaining the one or more properties of the range of DSN addresses, obtaining the one or more properties of each of the at least some of the plurality of DSN units, and performing a decentralized agreement protocol function on the obtained one or more properties of the range of DSN addresses and the obtained one or more properties of each of the at least some of the plurality of DSN units to produce the scoring resultant. The obtaining the one or more properties of the range of DSN addresses includes selecting the range of DSN addresses associated with the error message. For example, the DST client module 1 identifies a slice name associated with the error response A-1 as the range of DSN addresses. As another example, the DST client module 1 identifies a range of slice names associated with the error response A-1 as the range of DSN addresses.

The obtaining the one or more properties of each of the at least some of the plurality of DSN units includes a variety of approaches. In a first approach, the DSN unit accesses a centralized system registry to retrieve the one or more properties of the each of the at least some of the plurality of DSN units. For example, the DST client module 1 accesses the centralized system registry and extracts DSN unit identifiers and weighting factors of the DSN units. In a second approach of the obtaining the one or more properties of each of the at least some of the plurality of DSN units, the DSN unit extracts the one or more properties of the each of the at least some of the plurality of DSN units from the error message. For example, the DST client module 1 extracts the DSN unit identifiers and weighting factors of the DSN units from the error message, when the error message indicates identities of DSN units receiving the error message (e.g., a list of contending access units).

In a third approach of the obtaining the one or more properties of each of the at least some of the plurality of DSN units, the DSN unit (e.g., access unit 1) determines an expected number of concurrent write requests for a block of DSN addresses that includes the range of DSN addresses (e.g., block is one or more ranges) and selects the expected number of DSN units from the plurality of DSN units to produce the at least some of the plurality of DSN units. The determining the expected number of concurrent write requests includes one of accessing the centralized system registry to determine the expected number (e.g., a predetermined estimated number), randomly selecting the expected number using a random number generation function (e.g., pick a number between 5 and 20), determining the expected number based on historical concurrent write data for the range of DSN addresses (e.g., the DST client module 1 accesses a stark records), and determining the expected number based on information contained in the error message (e.g., a list of contending DSN units).

The selecting the expected number of DSN units includes one of accessing the centralized system registry to identify the selected number of DSN units (e.g., a predetermined list of DSN units based on an identity of the DSN unit), where the selected number of DSN units includes the DSN unit, using a random selection function to identify the selected number of DSN units (e.g., every other DSN unit), determining the selected number of DSN units based on historical concurrent write data for the range of DSN addresses (e.g., the DST client module 1 accesses the historical records), and determining the selected number of DSN units based on information contained in the error message (e.g., interpreting identifiers of the contending DSN units).

Having obtained the one or more properties of the range of DSN addresses and the one or more properties of each of the at least some of the plurality of DSN units, the DSN unit performs the decentralized agreement protocol function on the obtained one or more properties of the range of DSN addresses and the obtained one or more properties of each of the at least some of the plurality of DSN units to produce the scoring resultant. For example, the DST client module 1 issues a ranked scoring information request 414 to the decentralized agreement module 412 where the ranked scoring information request 414 includes the obtained one or more properties of the range of DSN addresses (e.g., slice names associated with the error message) and the obtained one or more properties of each of the at least some of the plurality of DSN units (e.g., identifiers of five of the access units and weighting factors of the five access units).

The decentralized agreement module 412 performs the decentralized agreement protocol function based on the ranked scoring information request 414 to produce ranked scoring information 416 as the scoring resultant. The performing of the decentralized agreement protocol function is discussed in greater detail with reference to FIG. 8B.

Having produced the scoring resultant, the DSN unit interprets the scoring resultant to determine a re-write requesting protocol for resending the write request to the DSN memory. The interpreting the scoring resultant to determine the re-write requesting protocol includes determining a re-write ranking of the DSN unit from the scoring resultant (e.g., ranking versus other DSN units of the contending DSN units) and further includes one of a variety of approaches to determine timing for the resending of the write request. A first approach includes the DSN unit determining, based on the re-write ranking, a time slot of a plurality of times slots for resending the write request (e.g., the access unit 1 determines that a fourth time slot of the plurality of timeslots for resending is associated with the access unit 1). A second approach includes the DSN unit determining, based on the re-write ranking, a wait period before resending the write request (e.g., the excess unit 1 determines that a fourth standard deviation of a wait period is associated with the access unit 1). When the re-write ranking is of highest ranking, a third approach includes the DSN unit substantially continually resending the write request until a write success response is received by the DSN unit (e.g., the DST client module 1 continually resends the write request A-1 until receiving the write access response). A fourth approach includes the DSN unit determining, based on the re-write ranking, a resending interval for resending the write request until the write success response is received by the DSN unit (e.g., the DST client module 1 selects a fourth standard interval between retrying sending of the write request A-1).

FIG. 8B is a schematic block diagram of an embodiment of an access unit that includes the DST client module 1 of FIG. 8A and the decentralized agreement module 412 of FIG. 8A. FIG. 8B illustrates further steps of the example of operation of the adjusting of timing of the storing of the data, and in particular performing of the decentralized agreement protocol function, where the DST client module 1 receives the error response A1 and generates the ranked scoring information request 414 to include a slice name 418 the obtained one or more properties of the range of DSN addresses and access unit identifiers (e.g., identifiers of access units 1-N when the at least some of the plurality of DSN units includes all of the DSN units) and access unit weights (e.g., weighting factors of access units 1-N when the at least some of the plurality of DSN units includes all of the DSN units) of the obtained one or more properties of each of the at least some of the plurality of DSN units. Having generated the ranked scoring information request 414, the DST client module 1 sends the ranked scoring information request 414 to the decentralized agreement module 412.

Each of the deterministic functions performs a first function based on an identifier of one of the at least some of the plurality of DSN units and the one or more properties of the range of DSN addresses to produce an interim result. For example, the deterministic function 2 performs a deterministic function on the slice name 418 and the access unit 2 identifier to produce an interim result 2. Each of the normalizing functions normalizes a corresponding interim result to produce a normalized result. For example, normalizing function 2 normalizes the interim result 2 to produce a normalized interim result 2. Each scoring function performs a second function based on the normalized result and a weighting factor for the one of the at least some of the plurality of DSN units to produce a score. For example, the scoring function 2 performs a scoring function on the normalized interim result 2 using the access 2 weight to produce a score 2 of a plurality of scores (e.g., 1-N). The ranking function 420 ranks the scores for each of the at least some of the plurality of DSN units to produce the ranked scoring information 416 as the scoring resultant. For example, the ranking function 420 indicates that a tenth DSN unit is associated with a highest score, a sixth DSN unit is associated with a second highest score, etc.

The DST client module 1 interprets the ranked scoring information 416 to determine the re-write requesting protocol. Having produced the re-write requesting protocol, the DST client module 1 resends the write request A-1 at t4 when the ranked scoring information 416 indicates that the access unit 1 is associated with resending the write request within a fourth time interval (e.g., at t4).

FIG. 8C illustrates further steps of the example of operation of the adjusting of timing of the storing of the data and where, having produced the re-write requesting protocol, the DSN unit resends the write request in accordance with the re-write requesting protocol. For example, the DST client module 1 resends, via the network 24, the write request A-1 at t4 to the DST execution unit set 410 when the ranked scoring information 416 indicates that the access unit 1 is associated with resending the write request within a fourth time interval (e.g., at t4).

Figure 8D:
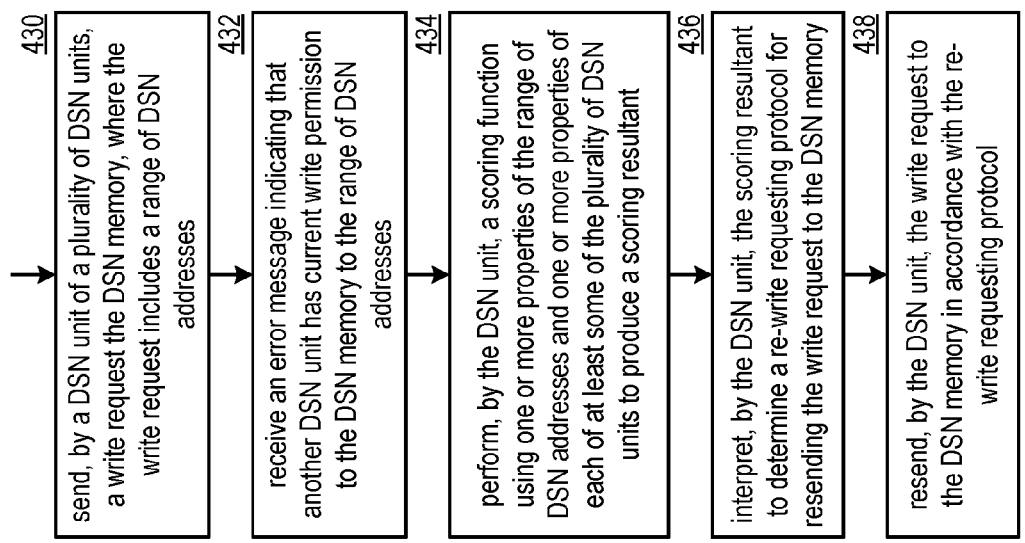
FIG. 8D is a flowchart illustrating an example of adjusting timing of storing data in accordance with the present invention.

Alternatively, or in addition to the steps discussed above, the DSN unit may utilize a first number of DSN units as the at least some of the plurality of DSN units when performing the scoring function to produce a first scoring resultant as the scoring resultant, interpret the first scoring resultant to determine a first re-write requesting protocol for resending the write request to the DSN memory, and resend the write request in accordance with the first re-write requesting protocol. When a second error message is received in response to the resending the write request in accordance with the first re-write requesting protocol, the DSN unit utilizes a second number of DSN units as the at least some of the plurality of DSN units when performing the scoring function to produce a second scoring resultant as the scoring resultant, interprets the second scoring resultant to determine a second re-write requesting protocol for resending the write request to the DSN memory, and resends the write request in accordance with the second re-write requesting protocol FIG. 8D is a flowchart illustrating an example of adjusting timing of storing data. In particular, a method is presented for use in conjunction with one or more functions and features described in conjunction with FIGS. 1-7D, and FIG. 8D. The method begins or continues at step 430 where a processing module of a computing device (e.g., a dispersed storage network (DSN) unit) of one or more computing devices of a DSN (e.g., one or more DSN units and other computing devices) sends a write request to DSN memory, where the write request includes a range of DSN addresses (e.g., a set of slice names).

In response to the write request, the method continues at step 432 where the processing module receives an error message indicating that another DSN unit of the plurality of DSN units has current write permission to the DSN memory to the range of DSN addresses. The method continues at step 434 where the processing module performs a scoring function using one or more properties of the range of DSN addresses and one or more properties of each of at least some of the plurality of DSN units to produce a scoring resultant.

The performing the scoring function includes obtaining the one or more properties of the range of DSN addresses, obtaining the one or more properties of each of the at least some of the plurality of DSN units, and performing a decentralized agreement protocol function on the obtained one or more properties of the range of DSN addresses and the obtained one or more properties of each of the at least some of the plurality of DSN units to produce the scoring resultant.

The obtaining the one or more properties of each of the at least some of the plurality of DSN units includes a variety of approaches. In a first approach, the processing module accesses a centralized system registry to retrieve the one or more properties of the each of the at least some of the plurality of DSN units, where the one or more properties of the each of the at least some of the plurality of DSN units includes at least one of a DSN unit identifier and a DSN unit weighting factor. In a second approach of the obtaining the one or more properties of each of the at least some of the plurality of DSN units, the processing module extracts the one or more properties of the each of the at least some of the plurality of DSN units from the error message.

The obtaining the one or more properties of each of the at least some of the plurality of DSN units may further include determining an expected number of concurrent write requests for a block of DSN addresses that includes the range of DSN addresses and selecting the expected number of DSN units from the plurality of DSN units to produce the at least some of the plurality of DSN units. The determining the expected number of concurrent write requests includes one of the processing module accessing a centralized system registry to determine the expected number, the processing module randomly selecting the expected number using a random number generation function, the processing module determining the expected number based on historical concurrent write data for the range of DSN addresses, and the processing module determining the expected number based on information contained in the error message.

The selecting the expected number of DSN units includes one of the processing module accessing the centralized system registry to identify the selected number of DSN units, where the selected number of DSN units includes the DSN unit, the processing module using a random selection function to identify the selected number of DSN units, the processing module determining the selected number of DSN units based on historical concurrent write data for the range of DSN addresses, and the processing module determining the selected number of DSN units based on information contained in the error message.

The performing the decentralized agreement protocol function on the obtained one or more properties of the range of DSN addresses and the obtained one or more properties of each of the at least some of the plurality of DSN units to produce the scoring resultant includes, for each of the at least some of the plurality of DSN units, the processing module performing a first function (e.g., a deterministic function) based on an identifier of one of the at least some of the plurality of DSN units and the one or more properties of the range of DSN addresses to produce an interim result, the processing module normalizing the interim result to produce a normalized result, and the processing module performing a second function (e.g., a scoring function) based on the normalized result and a weighting factor for the one of the at least some of the plurality of DSN units to produce a score. Having produced the scores, the processing module ranks the scores for each of the at least some of the plurality of DSN units to produce the scoring resultant.

The method continues at step 436 where the processing module interprets the scoring resultant to determine a re-write requesting protocol for resending the write request to the DSN memory. The interpreting includes the processing module determining a re-write ranking of the DSN unit from the scoring resultant and further includes one of the processing module determining, based on the re-write ranking, a time slot of a plurality of times slots for resending the write request, the processing module determining, based on the re-write ranking, a wait period before resending the write request, when the re-write ranking is of highest ranking, the processing module substantially continually resending the write request until a write success response is received by the DSN unit, and the processing module determining, based on the re-write ranking, a resending interval for resending the write request until the write success response is received by the DSN unit.

The method continues at step 438 where the processing module resends the write request in accordance with the re-write requesting protocol. Alternatively, or in addition to the steps discussed above, the processing module may utilize a first number of DSN units as the at least some of the plurality of DSN units when performing the scoring function to produce a first scoring resultant as the scoring resultant, interpret the first scoring resultant to determine a first re-write requesting protocol for resending the write request to the DSN memory, and resend the write request in accordance with the first re-write requesting protocol. When a second error message is received in response to the resending the write request in accordance with the first re-write requesting protocol, the processing module utilizes a second number of DSN units as the at least some of the plurality of DSN units when performing the scoring function to produce a second scoring resultant as the scoring resultant, interprets the second scoring resultant to determine a second re-write requesting protocol for resending the write request to the DSN memory, and resend the write request in accordance with the second re-write requesting protocol.

The method described above in conjunction with the processing module can alternatively be performed by other modules of the dispersed storage network or by other devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

Figure 9A:
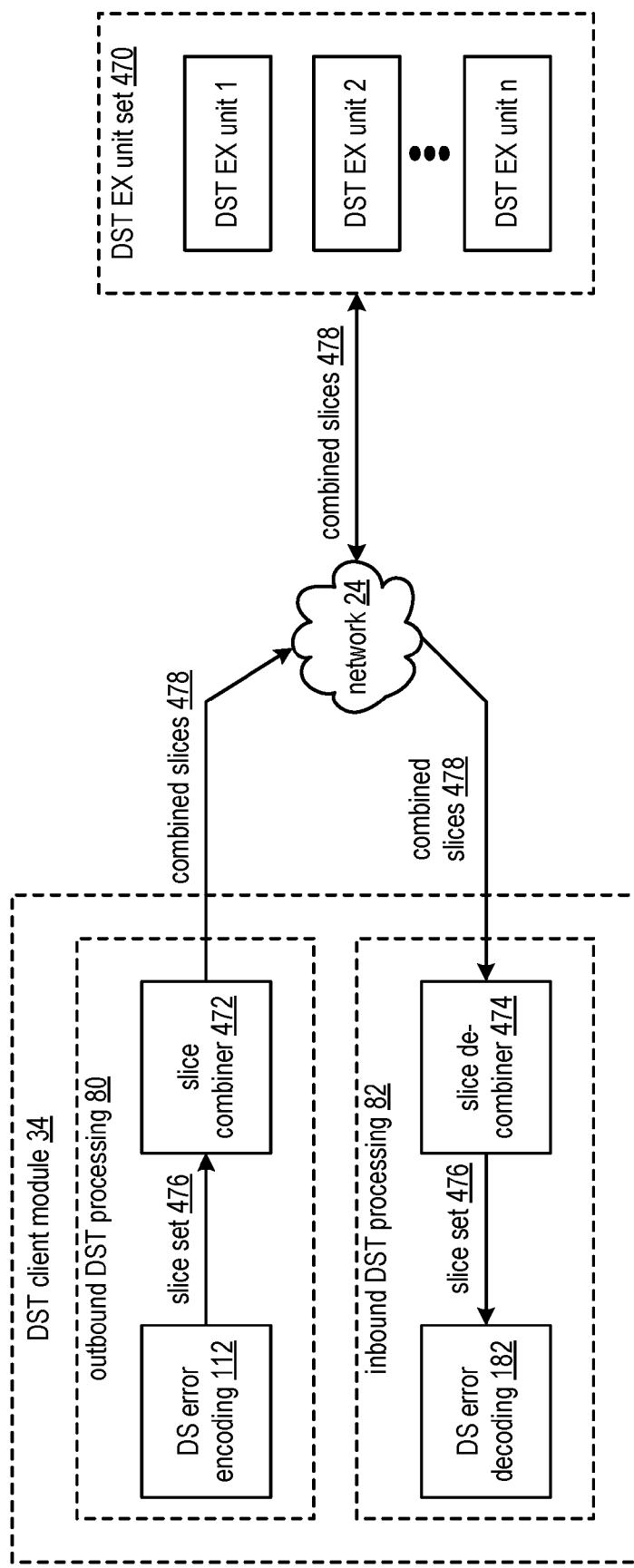
FIG. 9A is a schematic block diagram of another embodiment of a dispersed storage network (DSN) in accordance with the present invention.

FIG. 9A is a schematic block diagram of another embodiment of a dispersed storage network (DSN) that includes the distributed storage and task (DST) client module 34 of FIG. 1, the network 24 of FIG. 1, and a DST execution unit set 470. The DST client module 34 includes the outbound DST processing 80 and the inbound DST processing 82 of FIG. 3. The outbound DST processing 80 includes the dispersed storage (DS) error encoding 112 of FIG. 4 and a slice combiner 472. The inbound DST processing 82 includes the DS error decoding 182 of FIG. 13 and a slice de-combiner 474. The DST execution unit set 470 includes a set of DST execution units 1-$n$. Each DST execution unit may be implemented utilizing the DST execution unit 36 of FIG. 1.

The DSN functions to access stored data. In an example of operation of the accessing of the stored data, the DS error encoding 112 dispersed storage error encodes a data segment of data in accordance with dispersal parameters to produce a set of encoded data slices 476. The dispersal parameters includes one or more of an information dispersal algorithm (IDA) width, a decode threshold number, and an identifier of an encoding matrix. For example, the DS error encoding 112 utilizes dispersal parameters that includes an IDA width of 12 based on a system registry lookup for a vault associated with the data.

The slice combiner 472 determines a number of storage locations for storage of the set of encoded data slices. The determining may be based on one or more of initiating a query, receiving a query response, performing a lookup, and receiving storage location instructions. For example, the slice combiner 472 determines to utilize eight storage locations when the DST execution unit set includes eight DST execution units 1-8. For instance, the number of storage locations is less than the IDA width when the number of storage locations is eight and the IDA width is 12.

Having determined the number of storage locations, for each storage location, the slice combiner 472 combines a portion of at least two encoded data slices to produce a combined slice 478 for storage at the storage location in accordance with a combining approach when the number of storage locations is less than the IDA width. The combining approach includes one of an even distribution, a weighted distribution, and a predetermined distribution. For example, the slice combiner 472 combines halves of encoded data slices such that each storage location will receive three halves of an encoded data slice when the IDA width is 12 and the number of storage locations is eight. For instance, the slice combiner combines both halves of encoded data slice 1 with a first half of encoded data slice 2 to produce a first combined slice, combines a second half of encoded data slice 2 with both halves of encoded data slice 3 to produce a second combined slice, etc. Many other such combinations are possible.

For each combined slice, the outbound DST processing 80 sends, via the network 24, the combined slice 478 to the corresponding DST execution unit for storage. For example, the outbound DST processing 80 generates a write slice request that includes the first combined slice and sends, via the network 24, the first combined slice to the DST execution unit 1 for storage. The generating of the write request may further include generating one or more slice names associated with the at least two encoded data slices utilized to produce the combined slice.

When retrieving the data, the inbound DST processing 82 receives combined slices 478 from the DST execution unit set. For example, the inbound DST processing 82 issues, via the network 24, read slice requests to the DST execution unit set and extracts the combined slices 478 from received read slice responses. For each received combined slice, the slice de-combiner 474 performs a de-combiner function on the received combined slice to reproduce the portions of the at least two encoded data slices.

Having produced the portions of the at least two encoded data slices, the slice de-combiner 474 aggregates portions of combined encoded data slices to reproduce the set of encoded data slices 476. Alternatively, the slice de-combiner produces at least a decode threshold number of encoded data slices of the set of encoded data slices. The DS error decoding 182 dispersed storage error decodes the decode threshold number of encoded data slices of the reproduced set of encoded data slices 476 to produce a recovered data segment.

Figure 9B:
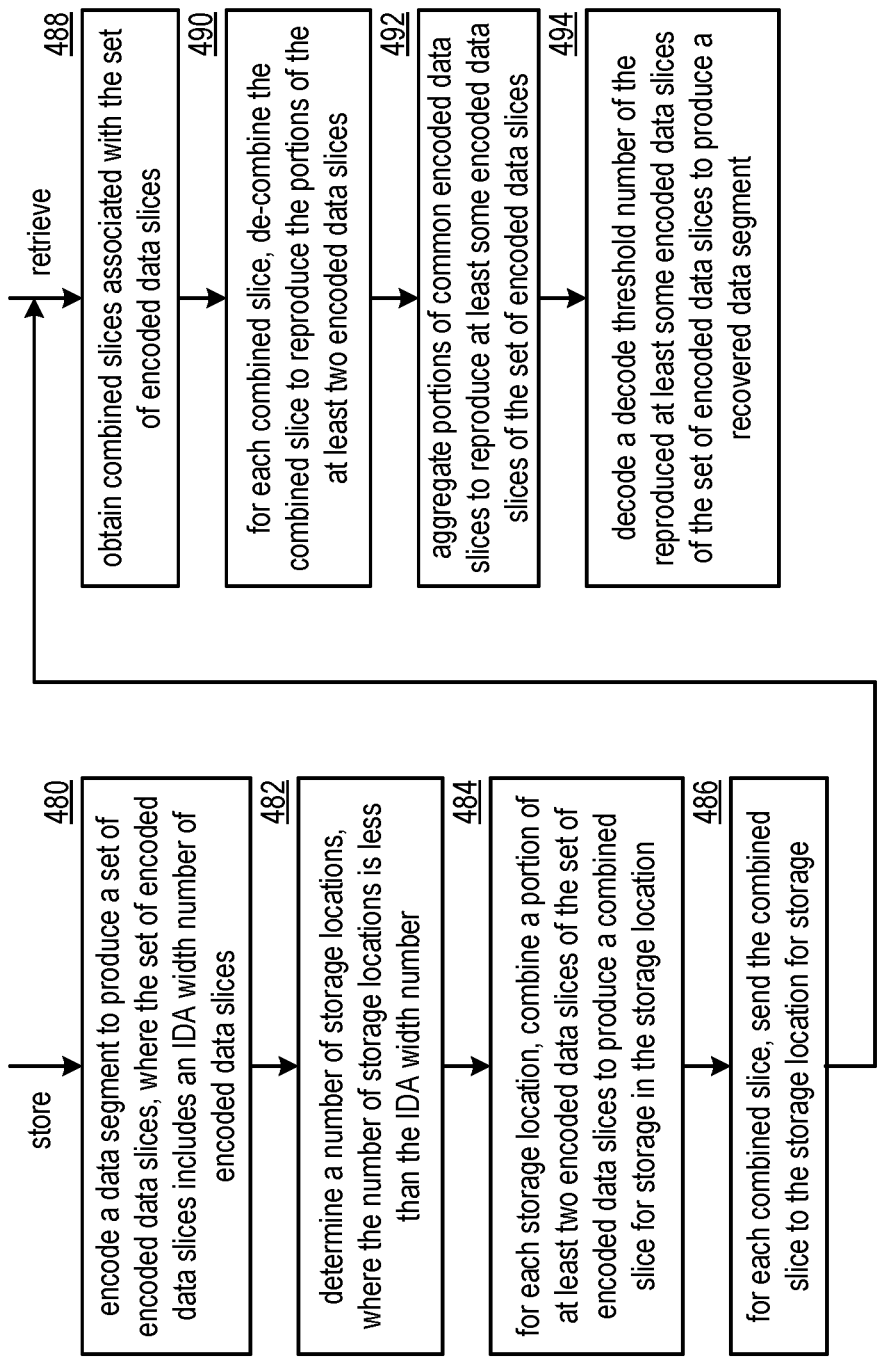
FIG. 9B is a flowchart illustrating an example of accessing stored data in accordance with the present invention.

FIG. 9B is a flowchart illustrating an example of accessing stored data. The method begins or continues at step 480 where a processing module (e.g., of a distributed storage and task (DST) client module), when storing data, encodes a data segment of data to produce a set of encoded data slices, where the set of encoded data slices includes an information dispersal algorithm (IDA) width number of encoded data slices. The method continues at step 482 where the processing module determines a number of storage locations, where the number of storage locations is less than the IDA width number. The determining includes at least one of interpreting a system registry, initiating a query, and interpreting a query response.

For each storage location, the method continues at step 484 where the processing module combines a portion of at least two encoded data slices of the set of encoded data slices to produce a combined slice for storage in the storage location. The combining is in accordance with a combining approach. For each combined slice, the method continues at step 486 where the processing module sends the combined slice to the storage location for storage.

When retrieving the data, the method continues at step 488 where the processing module obtains combined slices associated with a set of encoded data slices. For example, the processing module issues read slice requests to the storage locations, where the read slice requests includes slice names associated with the portions of the encoded data slices, and receives read slice responses that includes the combined slices.

For each combined slice, the method continues at step 490 where the processing module de-combines the combined slice to reproduce the portions of the at least two encoded data slices. For example, the processing module de-combines the combined slice in accordance with the combining approach to reproduce the portions of the at least two encoded data slices.

The method continues at 492 where the processing module aggregates portions of common encoded data slices to reproduce at least some encoded data slices of the set of encoded data slices. The method continues at step 494 where the processing module decodes a decode threshold number of the reproduced at least some encoded data slices of the set of encoded data slices to produce a recovered data segment.

Figure 10A:
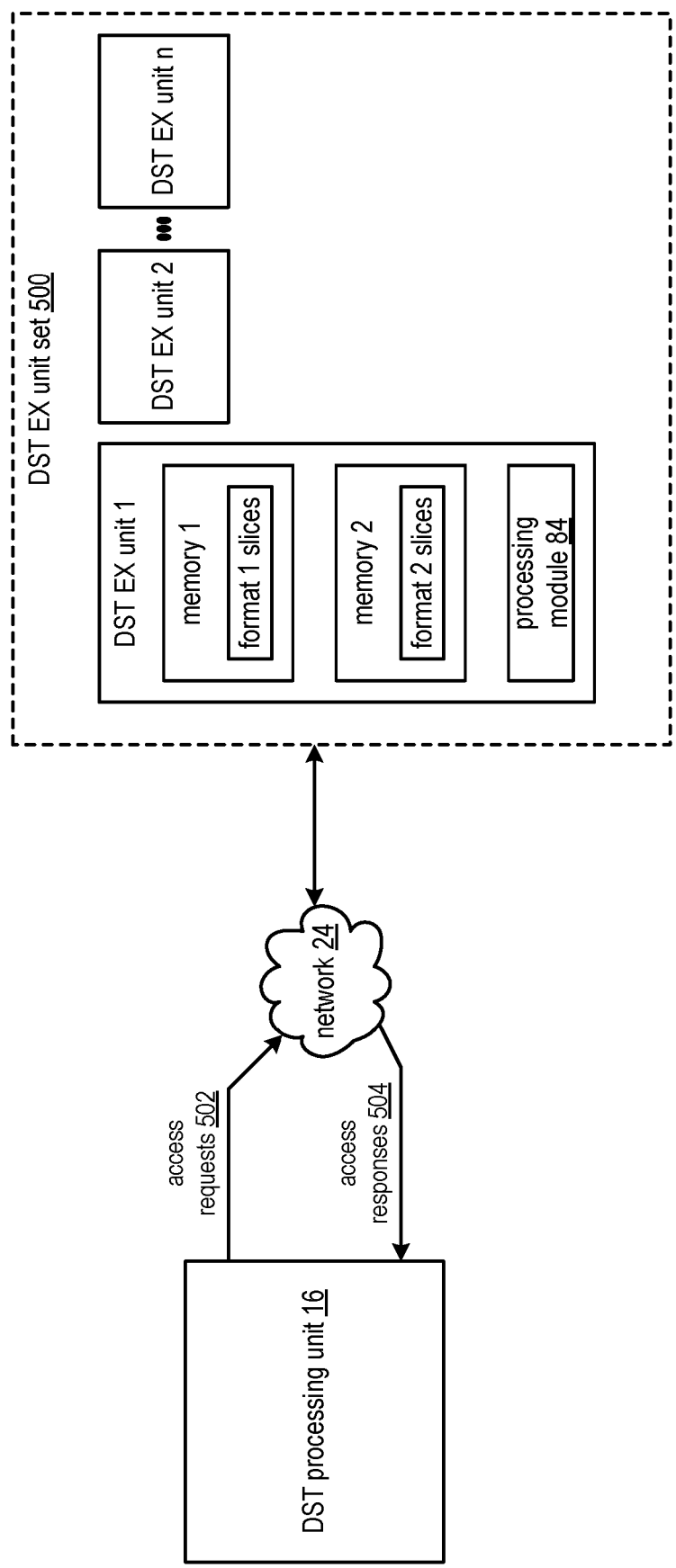
FIG. 10A is a schematic block diagram of another embodiment of a dispersed storage network (DSN) in accordance with the present invention.

FIG. 10A is a schematic block diagram of another embodiment of a dispersed storage network (DSN) that includes the distributed storage and task (DST) processing unit 16 of FIG. 1, the network 24 of FIG. 1, and a DST execution (EX) unit set 500. The DST execution unit set 500 includes a set of DST execution units 1-n. Each DST execution unit includes one or more memories 1-2 and the processing module 84 of FIG. 3.

The DSN functions to migrate data from a first storage format to a second storage format. In an example of operation of the migration of the data, the processing module 84 of DST execution unit 1 determines to update a storage format to a second storage format for a plurality of encoded data slices stored in a first memory utilizing a first storage format. The determining includes at least one of interpreting a request, identifying a data type, receiving new storage configuration information, detecting a storage efficiency level that compares unfavorably to a threshold level, and detecting an unfavorable performance level.

Having determined to update the storage format, the processing module 84 initiates migration of the plurality of encoded data slices from the first memory to a second memory, where the encoded data slices are stored in the second memory using the updated storage format. Alternatively, the first and second memories are a common memory. For example, the processing module 84 retrieves an encoded data slice stored in the first memory utilizing the first storage format and stores the retrieved encoded data slice in the second memory utilizing the second storage format.

While migrating the plurality of encoded data slices, the processing module 84 updates a rate of migration based on a DST execution unit activity level. The updating includes determining the updated DST execution unit activity level. For example, the processing module 84 monitors access requests 502 and access responses 504 associated with one or more of rebuilding encoded data slices, writing the encoded data slices, retrieving the encoded data slices, listing the encoded data slices, performing maintenance tasks, performing balancing tasks, and any other activities of the DST execution unit. For example, the processing module 84 lowers the rate (e.g., including pausing) of migration when detecting a higher than average DST execution unit activity level.

Figure 10B:
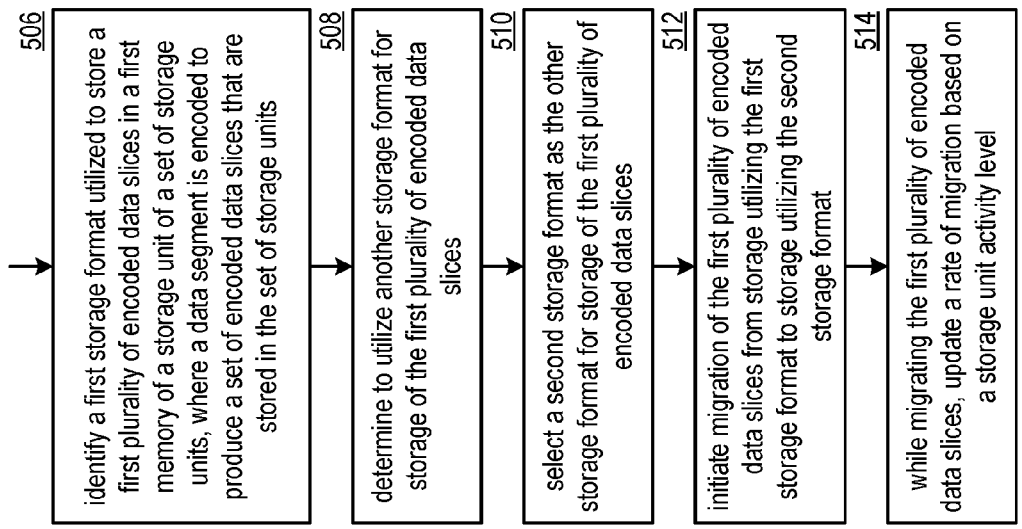
FIG. 10B is a flowchart illustrating an example of migrating data from a first storage format to a second storage format in accordance with the present invention.

FIG. 10B is a flowchart illustrating an example of migrating data from a first storage format to a second storage format. The method begins or continues at step 506 where a processing module (e.g., of a distributed storage and task (DST) execution unit, a storage unit) identifies a first storage format utilized to store a first plurality of encoded data slices in a first memory of the storage unit of a set of storage units, where a data segment is dispersed storage error encoded to produce a set of encoded data slices that are stored in the set of storage units. The identifying includes at least one of performing a lookup, initiating a query, interpreting a query response, receiving an error message, and detecting a storage inefficiency.

The method continues at step 508 where the processing module determines to utilize another storage format for storage of the first plurality of encoded data slices. The determining includes at least one of detecting the storage inefficiency, interpreting the error message, and detecting a favorable comparison of an available storage level to an available storage threshold level. The method continues at step 510 where the processing module selects a second storage format as the other storage format for storage of the first plurality of encoded data slices. The selecting includes at least one of identifying one or more other storage formats, estimating an updated level of storage performance for each of the one or more other storage formats, selecting a storage format as the second storage format that corresponds to a favorable estimated storage performance level (e.g., best or above a threshold level).

The method continues at step 512 where the processing module initiates migration of the first plurality of encoded data slices from storage utilizing the first storage format to storage utilizing the second storage format. The initiating includes retrieving an encoded data slice using the first storage format and storing the retrieved encoded data slice using the second storage format. The retrieving and storing may be with a common memory or different memories.

While migrating the first plurality of encoded data slices, the method continues at step 514 where the processing module updates a rate of migration based on a storage unit activity level. The updating includes one or more of monitoring the storage unit activity level, raising the rate of migration when the storage unit activity level is less than a low threshold level, and lowering the rate of migration when the storage unit activity level is greater than a high threshold level.

Figure 11A:
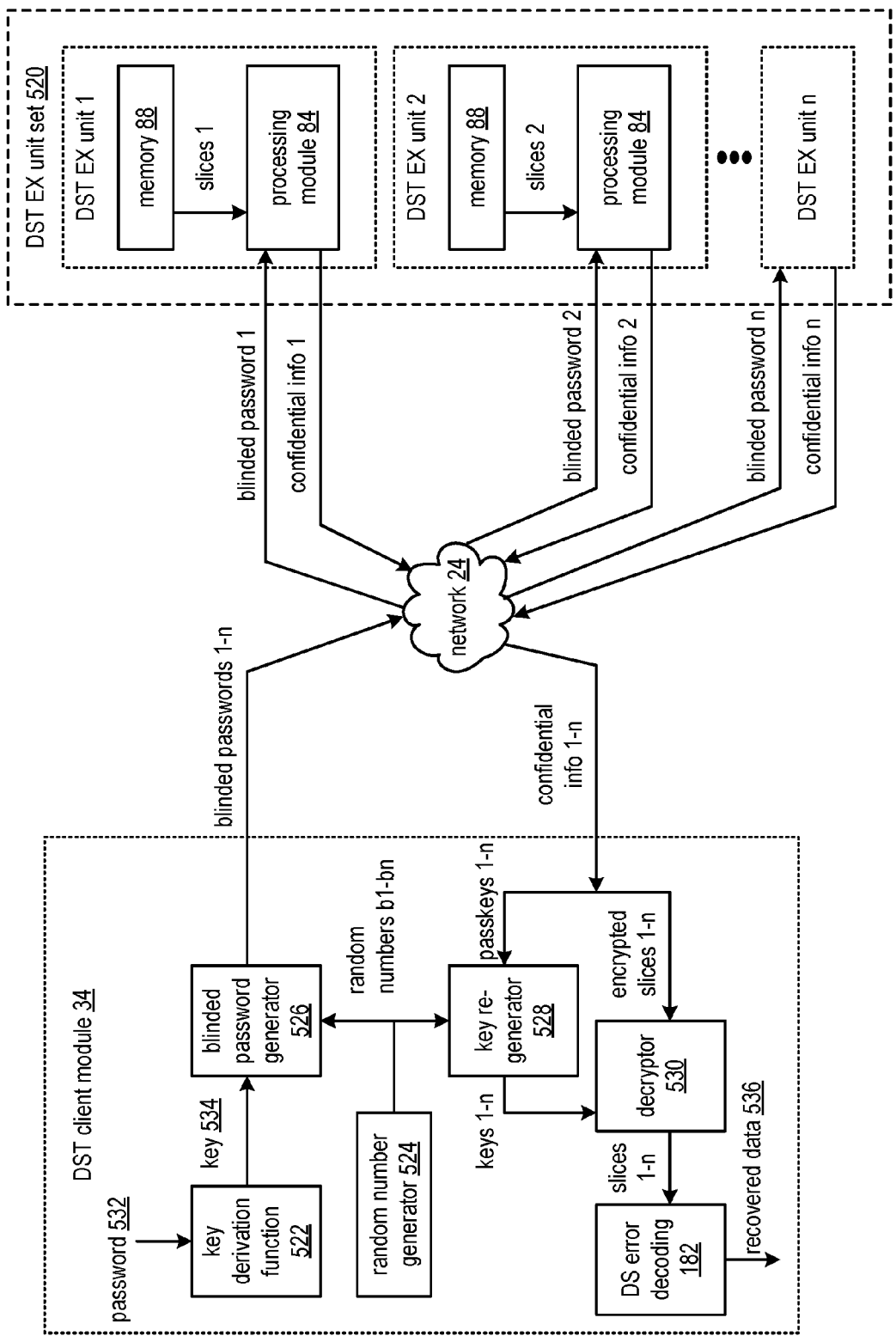
FIG. 11A is a schematic block diagram of another embodiment of a dispersed storage network (DSN) in accordance with the present invention.

FIG. 11A is a schematic block diagram of another embodiment of a dispersed storage network (DSN) the distributed storage and task (DST) client module 34 of FIG. 1, the network 24 of FIG. 1, and a DST execution (EX) unit set 520. The DST client module 34 includes a key derivation function 522, a blinded password generator 526, a random number generator 524, a key re-generator 528, a decryptor 530, and the dispersed storage (DS) error decoding 182 of FIG. 13. The DST execution unit set 520 includes a set of DST execution units 1-$n$. Each DST execution unit includes the memory 88 of FIG. 3 and the processing module 84 of FIG. 3.

The DSN functions to recover data stored in the DST execution unit set 520. In an example of operation of the recovering of the stored data, the key derivation function 522 performs a key derivation algorithm on a password 532 to produce a key 534. The key derivation algorithm generates the key 534 based on the password 532 in accordance with a number of desired bits for the key 534. Examples of the key derivation algorithm includes at least one of industry algorithms PBKDF2, bcrypt, and scrypt. Such a key derivation algorithm may take 100 ms or more to process the password 532, thus providing an anti-hacking system performance improvement.

The random number generator 524 generates a set of random numbers b1-bn. The blinded password generator 526 generates a set of blinded passwords 1-$n$ based on the key 534 and the set of random numbers b1-bn. For example, the blinded password generator 526 generates a first blinded password in accordance with the formula of: blinded password 1=[[MGF(KEY)]^2]^b1 modulo p; where MGF is a mask generating function, and p is a fixed number related to another fixed number q in accordance with a formula q=(p−1)/2. Having generated the set of blinded passwords 1-$n$, the DST client module 34 sends, via the network 24, the set of blinded passwords 1-$n$ to the set of DST execution units 1-$n$.

The processing module 84 of each DST execution unit generates corresponding confidential information based on a received blinded password, a corresponding recovered random number of a set of original random numbers e1-en, and a retrieved encrypted slice, where a data segment of data was previously dispersed storage error encoded to produce a set of encoded data slices and where each encoded data slice was encrypted using a corresponding key of a set of keys to produce an encrypted slice of a set of encrypted slices and where the set of keys were generated based on the password and the set of original random numbers e1-en and that includes the corresponding recovered random number. For example, the DST processing module 84 of DST execution unit 1 recovers a first encrypted slice from the memory 88 of the DST execution unit 1, recovers a first original random number e1, generates a first passkey of a set of passkeys 1-$n$ in accordance with a formula of: passkey 1=blinded password 1^e1 modulo p, and aggregates the first encrypted slice and the blinded password 1 to produce confidential information 1.

Having generated the corresponding confidential information, each DST execution unit sends the corresponding information to the DST client module 34. For example, the processing module 84 of the DST execution unit 1 sends, via the network 24, the confidential information 1 to the DST client module 34. The DST client module 34 receives at least a decode threshold number of a set of confidential information 1-$n$.

Having received the confidential information 1-$n$, the key re-generator 528 regenerates the set of keys 1-$n$ based on received passkeys 1-$n$ and the set of random numbers b1-bn when receiving passkeys 1-$n$. For example, the key re-generator 528 regenerates a first key in accordance with a formula of: key 1=passkey1^v1 modulo p, where v1 is derived based on a relationship of b1*v1=1 modulo q.

The decryptor 530 decrypts received encrypted slices 1-$n$ using the regenerated set of keys 1-$n$ to reproduce the set of encoded data slices 1-$n$. The DS error decoding 182 dispersed storage error decodes a decode threshold number of reproduced encoded data slices of the set of encoded data slices 1-$n$ to produce recovered data 536.

Figure 11B:
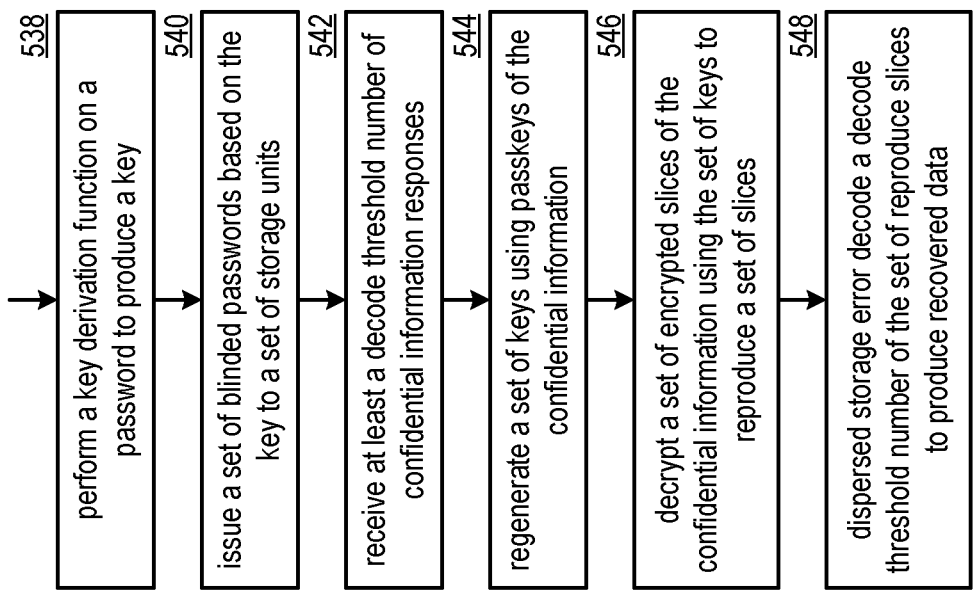
FIG. 11B is a flowchart illustrating an example of recovering data in accordance with the present invention.

FIG. 11B is a flowchart illustrating an example of recovering data. The method begins or continues at step 538 where a processing module (e.g., of a distributed storage and task (DST) client module) performs a key derivation function on a password to produce a key. The method continues at step 540 where the processing module issues a set of blinded passwords to a set of storage units, where the blinded passwords are generated based on the key. For example, the processing module generates a first blinded password in accordance with a formula of: blinded password 1=[[MGF(KEY)]^2]^b1 modulo p, where b1 is a random number of a set of random numbers.

The method continues at step 542 where the processing module receives at least a decode threshold number of confidential information responses, where each response includes an encrypted slice and an associated passkey, where a first passkey is generated by a corresponding storage unit in accordance with a formula of: passkey 1=bpass1^e1 modulo p; where e1 is a recovered random number associated with the encrypted slice and a corresponding original random number.

The method continues at step 544 where the processing module regenerates a set of keys using passkeys of the confidential information. For example, the processing module generates a first key of the set of keys in accordance with a formula of key 1=passkey1^v1 modulo p; where b1*v1=1 modulo q and where q=(p−1)/2.

The method continues at step 546 where the processing module decrypts a set of encrypted slices of the confidential information using the set of keys to reproduce a set of encoded data slices. For example, the processing module decrypts the encrypted slice 1 using the first key 1 to produce an encoded data slice 1 of the set of encoded data slices. The method continues at step 548 where the processing module dispersed storage error decodes a decode threshold number of the set of reproduced encoded data slices to produce recovered data.

Figure 12A:
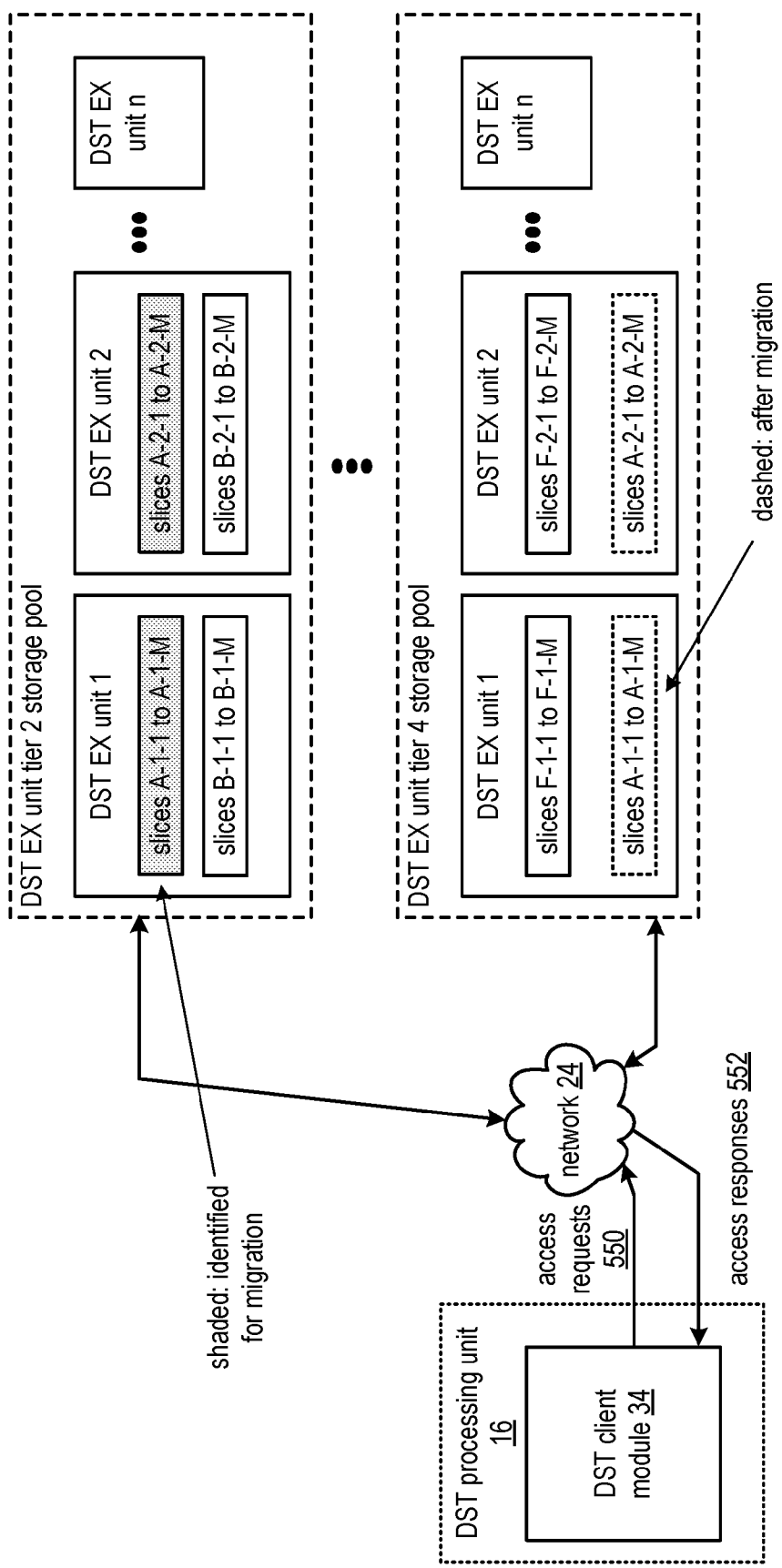
FIG. 12A is a schematic block diagram of another embodiment of a dispersed storage network (DSN) in accordance with the present invention.

FIG. 12A is a schematic block diagram of another embodiment of a dispersed storage network (DSN) that includes the distributed storage and task (DST) processing unit 16 of FIG. 1, the network 24 of FIG. 1, and at least two DST execution (EX) unit tier storage pools 2, and 4. The DST processing unit 16 includes the DST client module 34 of FIG. 1. Each DST execution unit tier storage pool includes a set of DST execution units 1-n. Each DST execution unit may be implemented utilizing the DST execution unit 36 of FIG. 1.

The DSN functions to migrate data stored in a first storage pool tier level to a second storage pool tier level, where data is dispersed storage error encoded to produce a plurality of sets of encoded data slices that is stored in the set of DST execution units of the first storage pool tier level. For example, a first data object A is dispersed storage error encoded to produce a plurality of sets of encoded data slices that are stored in the set of DST execution units of the DST execution unit tier 2 storage pool. For instance, slices A-1-1 to A-1-M are stored in DST execution unit 1, slices A-2-1 to A-2-M are stored in DST execution unit 2, etc.

In an example of operation of the migration, the DST client module 34 determines to update a storage pool tier level for data stored in the first storage pool, where the storage pool is associated with the first storage pool tier level. The determining includes at least one of interpreting an account update, identifying the data based on an account identifier, detecting nonpayment for storage services, detecting lower payment for storage services, detecting higher payment for storage services, interpret a storage pool tier level schedule, receiving a request, detecting data access inactivity, and detecting an unfavorable storage performance level. For example, the DST client module 34 identifies the encoded data slices associated with the data object A as the data stored in the first storage pool for updating of the storage pool tier level when payment for storage services of the data object A are delinquent.

Having determined to update the storage pool tier level, the DST client module 34 determines a second storage pool tier level based on the determining to update the storage pool tier level. The determining may be based on one or more of a comparison of actual payment for storage services to terms of payment for storage services. For example, the DST client module 34 determines to utilize a tier 4 storage pool for storage of the encoded data slices of the data object A when the payment for the storage services of the data object A are delinquent and the tier 4 storage pool is associated with low payment or nonpayment (e.g., a long-term storage service class, a storage service with lower retrieval reliability).

Having determined the second storage pool tier level, the DST client module 34 selects a set of DST execution units associated with the second storage pool. The selecting may be based on one or more of a request, a lookup of available sets of storage units and associated tier levels, a storage costs level, a round-robin selection approach, initiating a query, and interpreting a query response. For example, the DST client module selects the DST execution unit tier 4 storage pool when selecting the tier 4 storage pool level and the DST execution unit tier 4 storage pool is available with available storage capacity.

Having selected the second storage pool, the DST client module 34 facilitates migration of one or more sets of encoded data slices associated with the data from the first storage pool to the second storage pool. For example, the DST client module 34 issues access requests 550, via the network 24, to the DST execution unit tier 2 storage pool to retrieve the slices associated with the data object A, receives access responses 552 that includes the requested slices, and issues further access requests 550 to the DST execution unit tier 4 storage pool, where the further access requests 550 includes the slices associated with the data object A.

Having facilitated the migration of the one or more sets of encoded data slices, the DST client module 34 updates at least one of a DSN directory and a dispersed hierarchical index to associate the one or more sets of encoded data slices with the second storage pool and to disassociate the one or more sets of encoded data slices from the first storage pool. For example, the DST client module 34 updates an index entry of the dispersed hierarchical index to include a source name associated with the data object A, a data name for the data object A, and an identifier of the DST execution unit tier 4 storage pool.

Figure 12B:
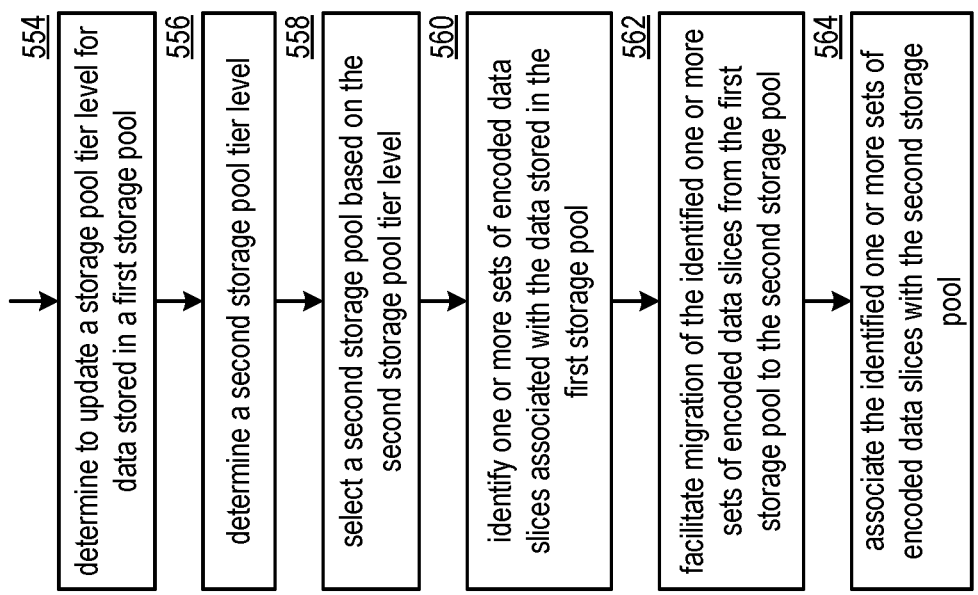
FIG. 12B is a flowchart illustrating an example of migrating data from a first storage pool tier level to a second storage pool tier level in accordance with the present invention.

FIG. 12B is a flowchart illustrating an example of migrating data from a first storage pool tier level to a second storage pool tier level. The method begins or continues at step 554 where a processing module (e.g., of a distributed storage and task (DST) client module) determines to update a storage pool tier level for data stored in a first storage pool. The determining may be based on one or more of interpreting a request, interpreting an account update, identifying the data based on an account identifier, detecting a payment mismatch for storage services, and detecting an unfavorable storage performance.

The method continues at step 556 where the processing module determines a second storage pool tier level, where the determining may be based on one or more of a level commensurate with the updated account, the payment mismatch, and a desired storage performance level. The method continues at step 558 where the processing module selects a second storage pool based on the second storage pool tier level. For example, the processing module identifies one or more storage pools associated with the second storage pool tier level, selects a storage pool based on one or more of availability, available storage space, pricing, a random selection, a preferred storage pool, and an estimated performance for a user.

The method continues at step 560 where the processing module identifies one or more sets of encoded data slices associated with the data stored in the first storage pool. The identifying includes at least one or more of accessing one or more of a dispersed storage network directory and a dispersed hierarchical index to identify one or more DSN address range that is associated with the data, identify slice names and the DSN address ranges, and identify stored encoded data slices associated with the identified slice names.

The method continues at step 562 where the processing module facilitates migration of the identified one or more sets of encoded data slices from the first storage pool to the second storage pool. For example, the processing module retrieves the identified one or more sets of encoded data slices from the first storage pool and stores the one or more sets of encoded data slices and the second storage pool.

The method continues at step 564 where the processing module associates the identified one or more sets of encoded data slices with the second storage pool. The associating includes updating at least one of the DSN directory and the dispersed hierarchical index to associate the identified slice names with the second storage pool and to disassociate the identified slice names from the first storage pool.

Figure 13A:
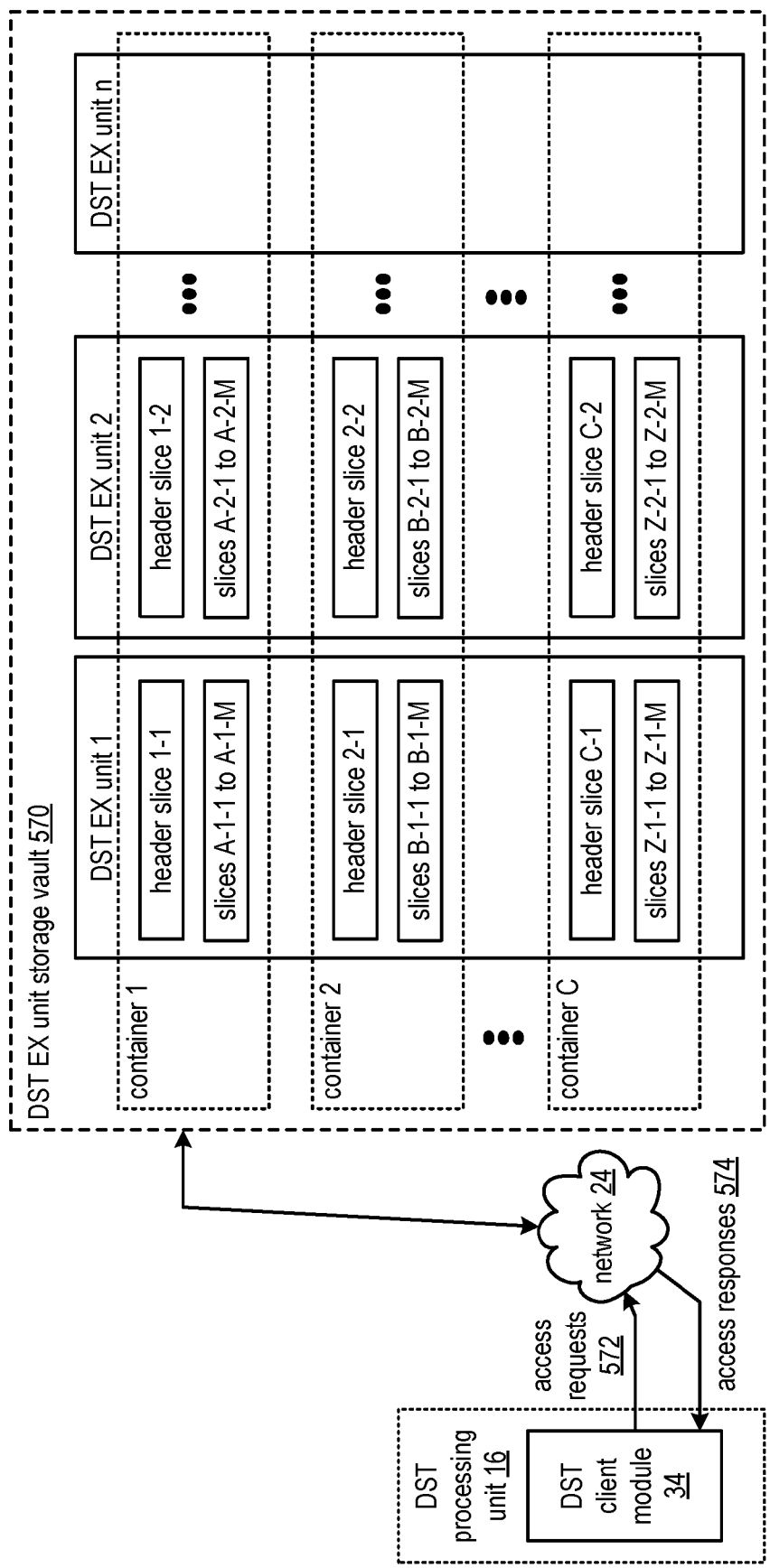
FIG. 13A is a schematic block diagram of another embodiment of a dispersed storage network (DSN) in accordance with the present invention.

FIG. 13A is a schematic block diagram of another embodiment of a dispersed storage network (DSN) that includes the distributed storage and task (DST) processing unit 16 of FIG. 1, the network 24 of FIG. 1, and a DST execution (EX) unit storage vault 570. The DST processing unit 16 includes the DST client module 34 of FIG. 1. The DST execution unit storage vault 570 includes at least one set of DST execution units 1-*n*. Each DST execution unit may be implemented utilizing the DST execution unit 36 of FIG. 1.

The DSN functions to access data stored in a plurality of containers 1-C (e.g., virtual containers) within the set of DST execution units 1-*n*, where data is dispersed storage error encoded to produce a plurality of sets of encoded data slices that are stored in at least one container within the set of DST execution units 1-*n*. For example, for a data object A, a plurality of sets encoded data slices, including A-1-1, A-2-1, through A-n-1 for a first set through an Mth set A-1-M, A-2-M, through A-n-M are stored in a first container within the set of DST execution units 1-*n*. In an example of operation, the DST client module 34 obtains a request (e.g., store, retrieve) to access the data associated with the first container of the DST execution unit storage vault.

Having obtained the request, the DST client module 34 identifies a first header object associated with the first container. The determining may include one or more of a performing local lookup, interpreting an index entry of a dispersed hierarchical index, interpreting a DSN directory entry, and may be further based on one or more of an identifier of a requesting entity, an identifier of the data, performing a container identifier look up based on the identifier of the requesting entity, and performing a lookup of a DSN address of the first header object based on the container identifier. For example, the DST client module 34 performs a dispersed hierarchical index lookup utilizing the identifier of the data to recover an index entry, extracts the container identifier of container 1 from the index entry, performs another dispersed hierarchical index lookup utilizing the container identifier to recover another index entry, and extracts the DSN address of the first header object from the recovered other index entry for the container 1.

Having identified the first header object, the DST client module 34 recovers the first header object from the DSN memory. For example, the DST client module 34 issues, via the network 24, access requests 572 to the set of DST execution units 1-*n* using the DSN address of the first header object, receives access responses 574, and decodes a decode threshold number of encoded headers slices of the access responses to reproduce the first header object.

Having reproduced the first header object, the DST client module 34 further processes the request to access the data utilizing a first encryption key extracted from the first header object. For example, the DST client module 34, when storing the data, encrypts the data using the first encryption key to produce encrypted data, dispersed storage error encodes the encrypted data to produce a plurality of sets of encoded data slices, and sends, via the network 24, the plurality of sets of encoded data slices to the set of DST execution units for storage. As another example, the DST client module 34, when retrieving the data, recovers a decode threshold number of encoded data slices for each set of encoded data slices from the set of DST execution units, decodes, for each set of encoded data slices, each decode threshold number of encoded data slices to produce recovered encrypted data, and decrypts the recovered encrypted data using the first encryption key to produce recovered data.

Having stored the data, the DST client module 34 may determine to make the data associated with the first container of the DST execution unit storage vault unusable. The determining may be based on one or more of receiving a data deletion request for the first container, interpreting a data deletion schedule, and detecting that an available storage space is less than a low available storage space threshold level.

When determining to make the data associated with the first container unusable, the DST client module 34 identifies the first data object associated with the first container. Having identified the first header object, the DST client module 34 facilitates disabling use of the first encryption key of the first header object.

As a specific example, the DST client module 34 recovers the first header object, deletes the first encryption key to produce an updated first header object, and stores the updated first header object in the set of DST execution units 1-*n*. The storing includes dispersed storage error encoding the updated first header object to produce a set of updated first header object slices and sending, via the network 24, the set of updated first header object slices to the set of DST execution units 1-*n* for storage.

As another specific example, the DST client module 34 recovers the first header object, generates a copy of the first header object, stores the copy of the first header object in another data object, deletes the first encryption key from the first header object to produce the updated first header object, and stores the updated first header object in the set of DST execution units 1-*n*. As yet another specific example, the DST client module 34 recovers the first header object, encrypts the first encryption key using a secret key to produce an obfuscated first encryption key, replaces the first encryption key with the obfuscated first encryption key within the recovered first header object to produce the updated first header object, and stores the updated first header object in the set of DST execution units 1-*n*.

Figure 13B:
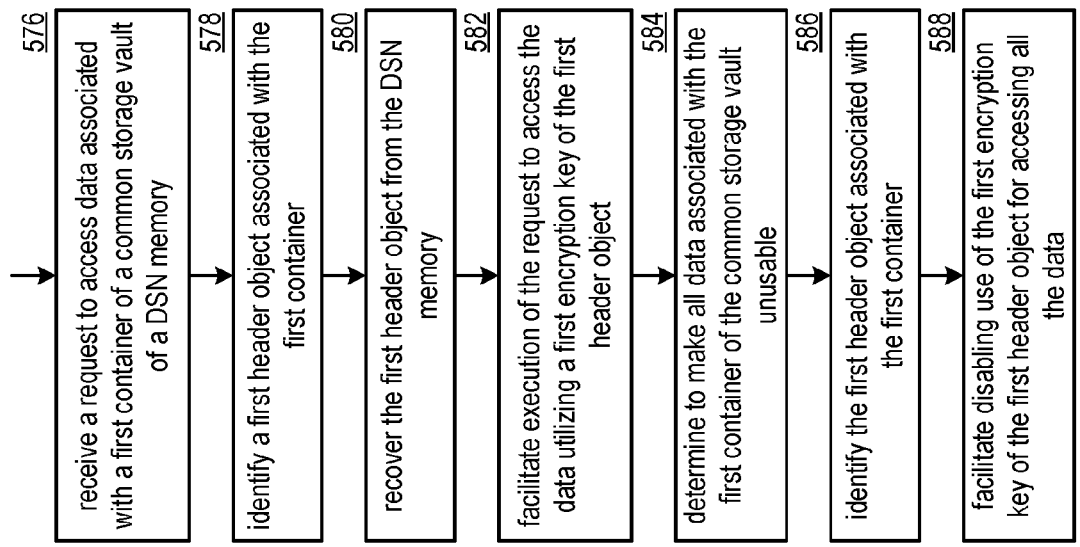
FIG. 13B is a flowchart illustrating an example of accessing data within a vault storage container of a dispersed storage network (DSN) in accordance with the present invention.

FIG. 13B is a flowchart illustrating an example of accessing data within a vault storage container of a dispersed storage network (DSN). The method begins or continues at step 576 where a processing module (e.g., of a distributed storage and task (DST) client module) receives a request to access data associated with a first container of a common storage vault of a DSN memory. The receiving includes at least one of receiving a retrieval request and receiving a storage request.

The method continues at step 578 where the processing module identifies a first header object associated with the first container. For example, the processing module identifies the common storage vault and a container ID based on one or more of a requesting entity identifier and an identifier of the data; and performs a lookup using the container ID to obtain a DSN address of the first header object.

The method continues at step 580 where the processing module recovers the first header object from the DSN memory. For example, the processing module issues read slice requests to the DSN memory using the DSN address of the first header object, receives header slices, and dispersed storage error decodes a decode threshold number of the header slices to reproduce the first header object.

The method continues at step 582 where the processing module facilitates execution of the request to access the data utilizing a first encryption key of the first header object. As a storage example, the processing module extracts the first encryption key from the first header object, encrypts the data using the extracted first encryption key to produce encrypted data, dispersed storage error encodes the encrypted data to produce slices, and sends the slices to a set of storage units associated with the first container. As a retrieval example, the processing module extracts the first encryption key from the first header object, recovers slices from the first container of the set of storage units, dispersed storage error decodes the recovered slices to reproduce the encrypted data, and decrypts the encrypted data using the extracted first encryption key to reproduce the data.

The method continues at step 584 where the processing module determines to make all data associated with the first container of the common storage vault unusable. The determining may be based on one or more of receiving a delete container request, receiving a hide container request, receiving a make unusable request, interpreting a storage error, and interpreting an error message.

The method continues at step 586 where the processing module identifies the first data object associated with the first container. For example, the processing module performs a lookup using the container identifier to obtain the DSN address of the first header object. The method continues at step 588 where the processing module facilitates disabling use of the first encryption key of the first header object for accessing all the data. As a specific example, the processing module permanently deletes the first encryption key. As another example, the processing module moves the first encryption key to another storage location. As yet another example, the processing module replaces the first encryption key with an encrypted version of the first encryption key utilizing a secret key. Alternatively, or in addition to, the processing module deletes encoded data slices associated with the first container (e.g., for each set of encoded data slices associated with each data object associated with the first container).

Figure 14A:
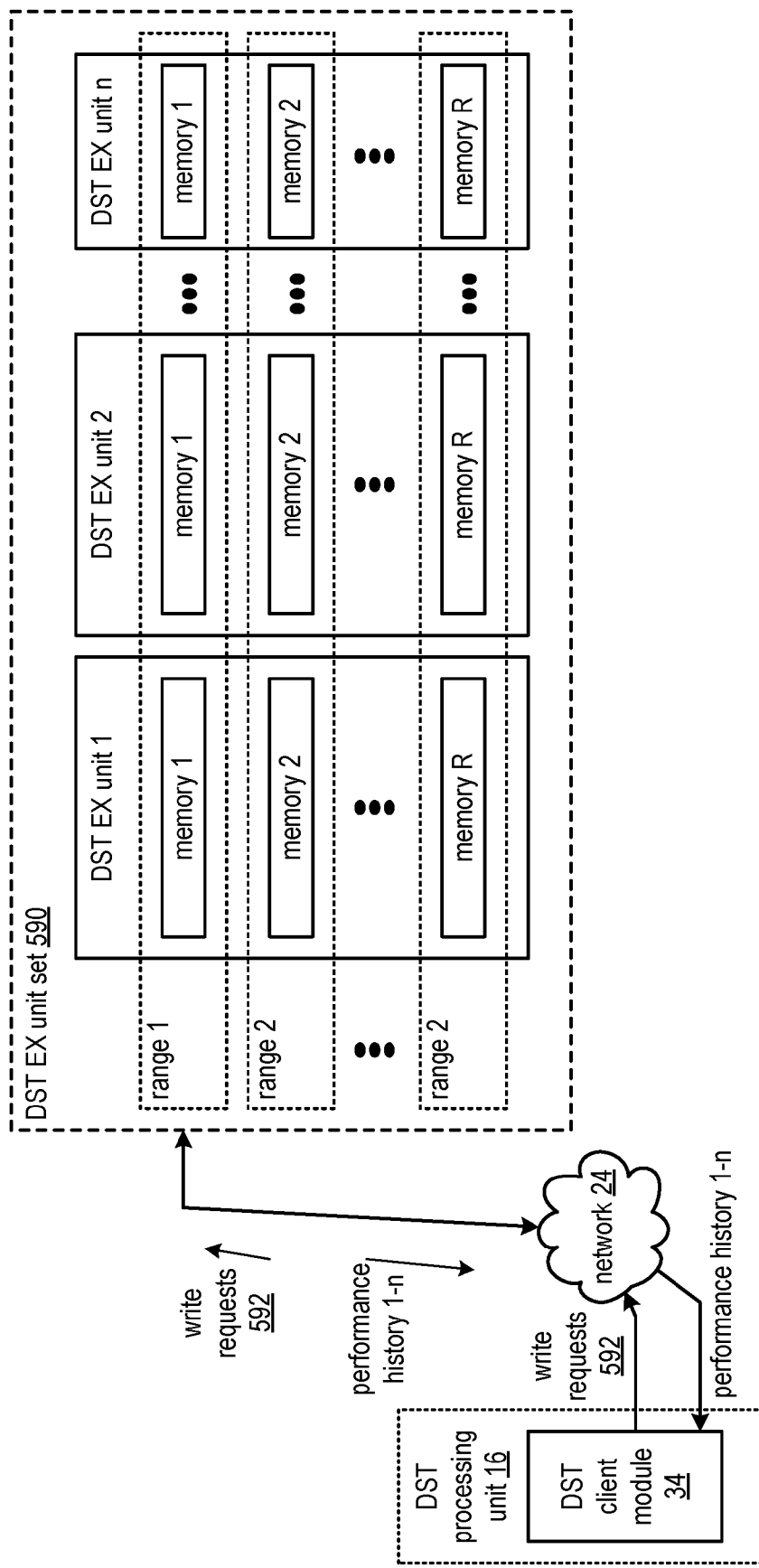
FIG. 14A is a schematic block diagram of another embodiment of a dispersed storage network (DSN) in accordance with the present invention.

FIG. 14A is a schematic block diagram of another embodiment of a dispersed storage network (DSN) that includes the distributed storage and task (DST) processing unit 16 of FIG. 1, the network 24 of FIG. 1, and a DST execution (EX) unit set 590. The DST processing unit 16 includes the DST client module 34 of FIG. 1. The DST execution unit set 590 includes a set of DST execution units 1-*n*. Each DST execution unit includes a plurality of memories 1-R. Each DST execution unit may be implemented utilizing the DST execution unit 36 of FIG. 1.

The DSN functions to select a set of memories for storage of one or more sets of encoded data slices of data for storage, where the set of DST execution units includes a plurality of sets of memories that includes the selected set of memories, where each set of memories is associated with a unique DSN address range of a plurality of DSN address ranges associated with the set of DST execution units. In an example of operation of the selecting of the set of memories, the DST client module 34 obtains performance history from each DST execution unit of the DST execution unit set 590, where the performance history includes performance level history of each memory device of the plurality of memory devices associated with the DST execution unit.

The performance level history includes one or more of an access frequency level, an access latency level, a throughput level, an available storage space level, a utilized storage space level, and a storage capacity level. The obtaining includes at least one of issuing a performance history request, receiving a performance history response, interpreting an error message, and performing a lookup. For example, the DST client module 34 receives performance history 1-*n* from the DST execution unit set in response to issuing, via the network 24, the performance history request.

Having obtained the performance history, the DST client module 34 obtains a set of encoded data slices for storage in the set of DST execution units 1-*n*. The obtaining includes at least one of receiving the set of encoded data slices and dispersed storage error encoding a data segment of the data to produce the set of encoded data slices.

Having obtained the set of encoded data slices, the DST client module 34 selects a set of memory devices of the plurality of sets of memory devices based on the performance history in accordance with a selection approach. As a specific example, the selection approach includes identifying a set of memory devices associated with the at least a threshold number (e.g., a write threshold number) of memory devices with favorable performance histories (e.g., similar history, above a threshold level, fastest, most available space, at least active).

Having selected the set of memory devices, the DST client module 34 generates a set of slice names corresponding to the selected set of memory devices. As a specific example, the DST client module 34 identifies a DSN address range associated with a set of memory devices based on lookup, generates a source name associated with the identify DSN address range that includes the generated source name, and generates the set of slice names to include the source name.

Having generated the set of slice names, the DST client module 34 generates a set of write slice requests 592 that includes the set of slice names of the set of encoded data slices. Having generated the set of write slice requests 592, the DST client module 34 sends, via the network 24, the set of write slice requests 592 to the DST execution unit set to store the set of encoded data slices in the selected set of memory devices.

Figure 14B:
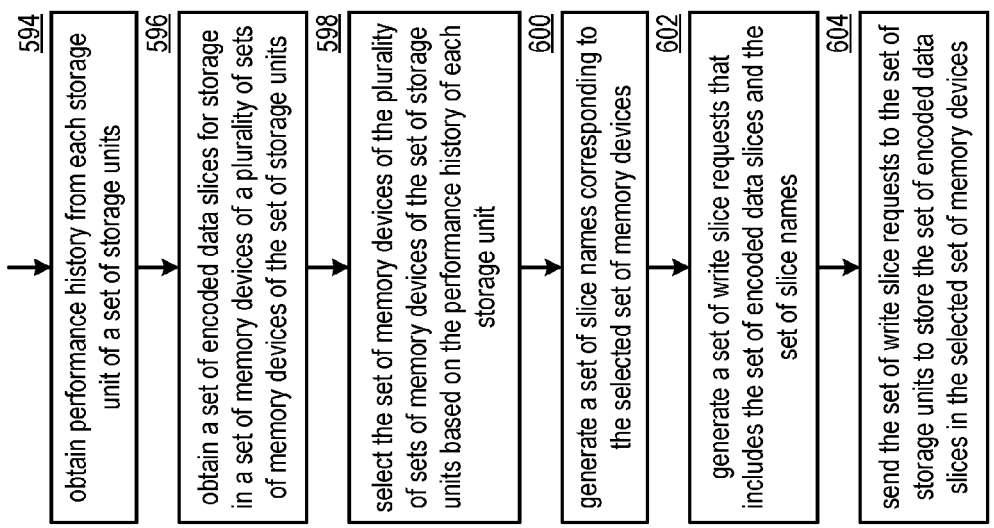
FIG. 14B is a flowchart illustrating an example of selecting a set of memory devices in accordance with the present invention.

FIG. 14B is a flowchart illustrating an example of selecting a set of memory devices. The method begins or continues at step 594 where a processing module (e.g., of a distributed storage and task (DST) client module) obtains performance history from each storage unit of a set of storage units. The obtaining includes at least one of issuing a set of performance history requests to the set of storage units, receiving performance history responses from at least some of the storage units, interpreting an error message, and performing a lookup.

The method continues at step 596 where the processing module obtains a set of encoded data slices for storage in a set of memory devices of a plurality of sets of memory devices of the set of storage units. The obtaining includes at least one of receiving the set of encoded data slices and dispersed storage error encoding a data segment of data to produce the set of encoded data slices.

The method continues at step 598 where the processing module selects the set of memory devices of the plurality of sets of memory devices of the set of storage units based on the performance history of each storage unit. For example, the processing module identifies the set of memory devices associated with at least a threshold number of memory devices that exhibit favorable performance histories in accordance with a selection scheme. The selection schemes includes one or more of selecting similarly performing memory devices, selecting memory devices associated with the performance level above a performance threshold level, selecting fastest performing memory devices, selecting memory devices associated with highest levels of available storage space, and selecting storage units associated with lowest levels of access frequency.

The method continues at step 600 where the processing module generates a set of slice names corresponding to the selected set of memory devices. For example, the processing module generates a source name associated with a dispersed storage network address range affiliated with the set of memory devices and generates the set of slice names to include the generated source name.

The method continues at step 602 where the processing module generates a set of write slice requests that includes the set of encoded data slices and the set of slice names. The method continues at step 604 where the processing module sends the set of write slice requests to the set of storage units to store the set of encoded data slices in the selected set of memory devices.

Figure 15A:
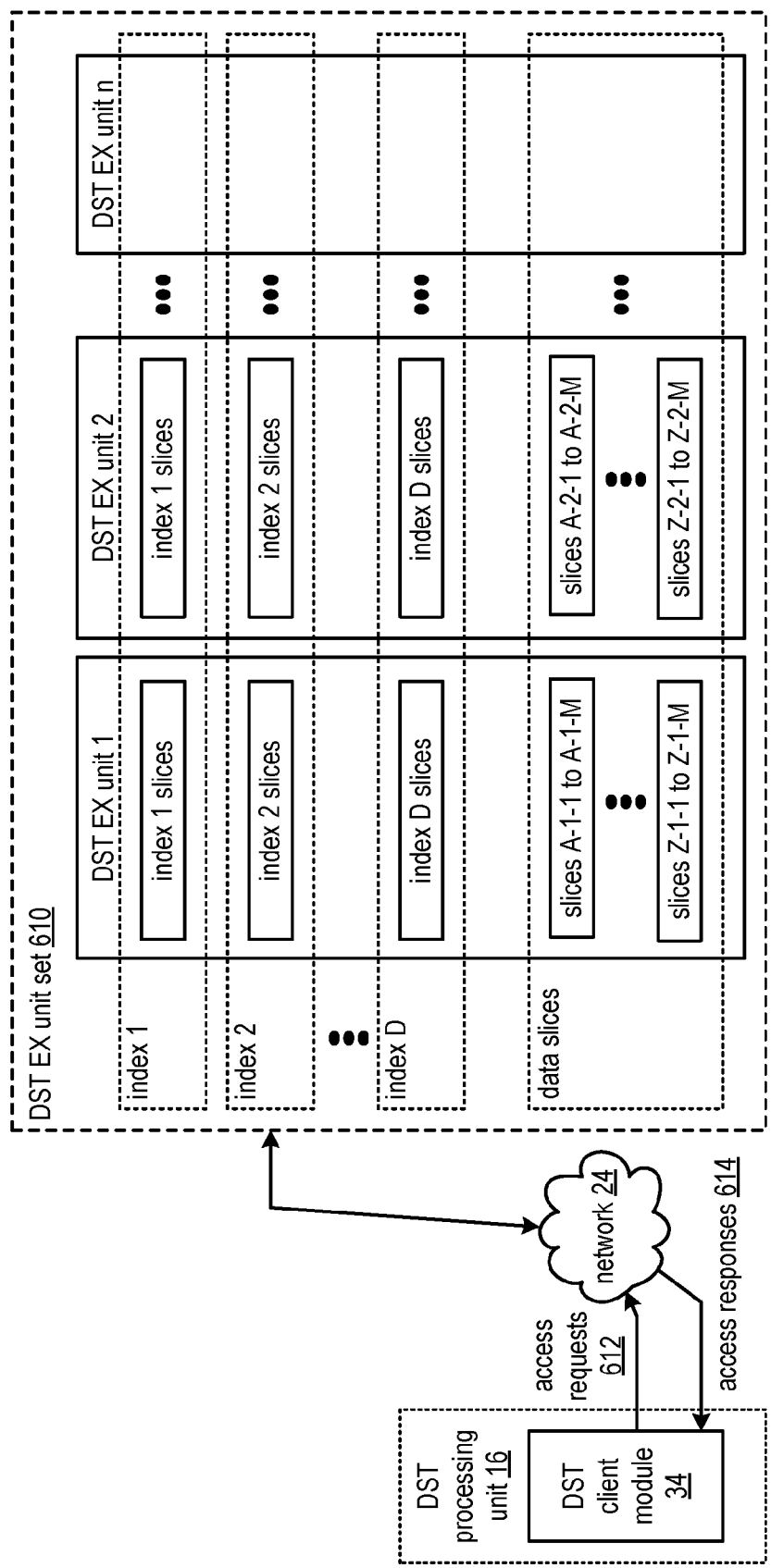
FIG. 15A is a schematic block diagram of another embodiment of a dispersed storage network (DSN) in accordance with the present invention.

FIG. 15A is a schematic block diagram of another embodiment of a dispersed storage network (DSN) that includes the distributed storage and task (DST) processing unit 16 of FIG. 1, the network 24 of FIG. 1, and a DST execution (EX) unit set 610. The DST processing unit 16 includes the DST client module 34 of FIG. 1. The DST execution unit set 610 includes a set of DST execution units 1-n. Each DST execution unit may be implemented utilizing the DST execution unit 36 of FIG. 1.

The DSN functions to update a dispersed hierarchical index and to synchronize the dispersed hierarchical index with stored data. The dispersed hierarchical index may include a dispersed lockless concurrent index in a dispersed data structure that maintains and in-order transportable list of entries indexed by a one or more index keys. For example, for each data object stored in the DST execution unit set as sets of encoded data slices (e.g., A-1-1 to A-1-M, A-2-1 to A-2-M, etc., of a data object A), one or more dispersed hierarchical indexes may be updated to insert a data name associated with the data object A. The dispersed hierarchical index supports an ordered listing of stored data objects in a similar fashion to a directory hierarchy. A data object may be a reference to any number of dispersed hierarchical indexes 1-D. Each dispersed hierarchical index is associated with an index type. Index types include at least one of by name, by time, and by any other common attribute. The index keys are affiliated with the index type. For example, a time-based index key is utilized with a dispersed article index associated with a time index type.

An example of operation of the synchronizing of the dispersed hierarchical index with stored data is discussed in greater detail with reference to FIG. 16. In an example of operation of the updating of the dispersed hierarchical index, the DST client module 34 determines that an update is required to one or more dispersed hierarchical indexes 1-D associated with data stored in the DST execution unit set. The determining may be based on one or more of updating storage of the data, receiving a request, and identifying a storage mismatch.

Having determined that the update is required, the DST client module 34 obtains a performance level of the DST execution unit set. The obtaining includes at least one of interpreting a test result, accessing a historical record, interpreting an error message, and monitoring and access level. Having obtained the performance level of the DST execution unit set, for each of the one or more dispersed hierarchical indexes, the DST client module 34 determines an update schedule based on the performance level of the DST execution unit set and in accordance with an update prioritization approach. The update prioritization approach includes one or more of updating a primary index immediately, updating in accordance with a priority level of each index, always updating all indexes, and updating a portion of an index based on an activity level of the DST execution unit set. As a specific example, the DST client 34 temporarily suspends updating at least some of the one or more dispersed hierarchical indexes associated with the data when access frequency levels of the DST execution units is greater than a high access frequency threshold level (e.g., too busy to update now) in favor of maintaining a temporary local directory to cache pending updates.

Having determined the update schedule, for each of the one or more dispersed hierarchical indexes, the DST client module 34 updates the dispersed hierarchical index in accordance with the update schedule. For example, the DST client module 34, when scheduled, issues access requests 612 to the DST execution unit set to recover an index entry, receives access response 614, updates the index entry (e.g., based on a recently determined required update, based on a cached update) to produce an updated index entry, and issues further access requests 612 to the DST execution unit set to store the updated index entry. Alternatively, the DST client module 34 may generate a new index entry for storage in the DST execution unit set. While updating the one or more dispersed hierarchical indexes, the DST client module 34 may further update the update schedule. The example of the operation of the updating of the dispersed hierarchical index is discussed in greater detail with reference to FIG. 15B.

Figure 15B:
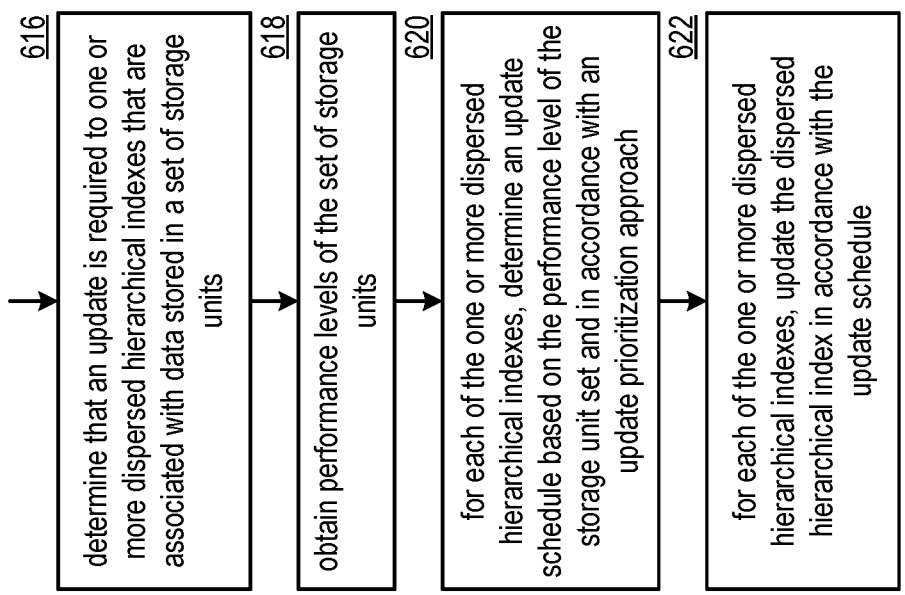
FIG. 15B is a flowchart illustrating an example of updating a dispersed hierarchical index in accordance with the present invention.

FIG. 15B is a flowchart illustrating an example of updating a dispersed hierarchical index. The method begins or continues at step 616 where a processing module (e.g., of a distributed storage and task (DST) client module) determines that an update is required to one or more dispersed hierarchical indexes that are associated with data stored in a set of storage units. The determining may be based on one or more of detecting updating of storage of the data, receiving a request to update the data, and identifying a mismatch between a local representation of an index and a representation of the index recovered from the set of storage units.

The method continues at step 618 where the processing module obtains performance levels of the set of storage units. The obtaining includes at least one of initiating a performance test, interpreting a performance test result, accessing a record, interpreting an error message, and interpreting monitored storage unit set access messages.

For each of the one or more dispersed hierarchical indexes, the method continues at step 620 where the processing module determines an update schedule based on the performance level of the storage unit set and in accordance with an update prioritization approach. As a specific example, the processing module identifies the prioritization approach (e.g., performs a lookup, receives a request, determines based on one or more of a data type, a requesting entity identifier, a time of day, and a level of storage unit activity) and implements the prioritization approach to produce the updated schedule.

For each of the one or more dispersed hierarchical indexes, the method continues at step 622 where the processing module updates the dispersed hierarchical index in accordance with the update schedule. As a specific example, the processing module accesses the dispersed hierarchical index from the set of storage units to facilitate synchronization of the accessed dispersed hierarchical index with a local representation of the dispersed article index (e.g., recover, update, store).

Figure 16:
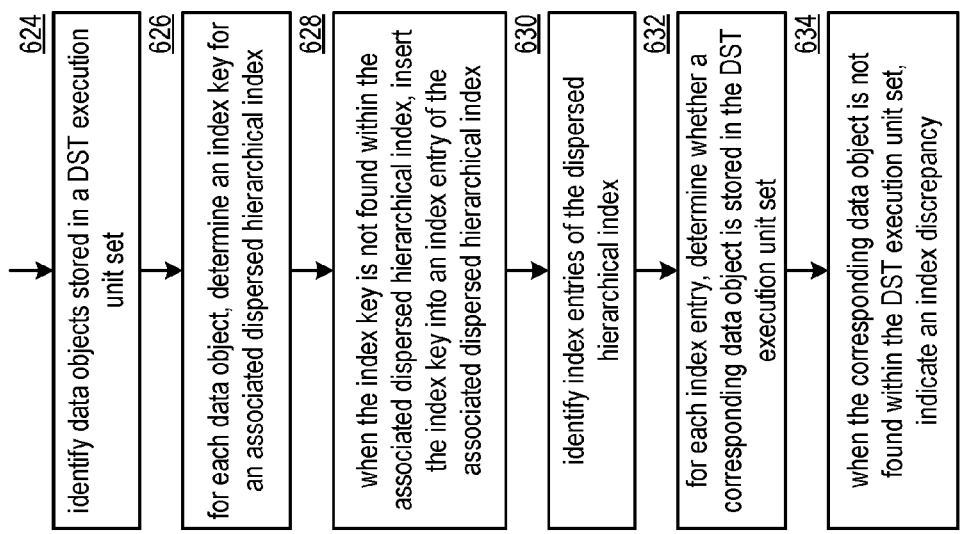
FIG. 16 is a flowchart illustrating an example of synchronizing a dispersed hierarchical index with stored data in accordance with the present invention.

FIG. 16 is a flowchart illustrating an example of synchronizing a dispersed hierarchical index with stored data. In the example of operation of the synchronizing of the dispersed hierarchical index with the stored data, the method begins or continues at step 624 where a processing module (e.g., of a distributed storage and task (DST) client module) identifies data objects stored in a DST execution unit set. The identifying includes at least one of accessing a list (e.g., a dispersed storage network directory) to identify a data object and verifying that the data object is stored in the DST execution unit set.

For each data object, the method continues at step 626 where the processing module determines an index key for an associated dispersed hierarchical index. As a specific example, the processing module analyzes the data object to identify a data object attribute (e.g., a name, a timestamp, a metric, a size, a data type, a data owner, etc.) and generates the index key based on the data object attribute.

When the index key is not found within the associated dispersed hierarchical index, the method continues at step 628 where the processing module inserts the index key into an index entry of the associated dispersed hierarchical index. As a specific example, the processing module updates the index entry and stores the updated index entry in the DST execution unit set (e.g., in accordance with an update schedule).

The method continues at step 630 where the processing module identifies index entries of the dispersed hierarchical index. As a specific example, the processing module traverses the dispersed hierarchical index to identify the index entries. For each index entry, the method continues at step 632 where the processing module determines whether a corresponding data object is stored in the DST execution unit set. As a specific example, the processing module accesses a dispersed storage network address associated with the index entry (e.g., issues a list request and receives a list response to determine whether a slice is exist for the data object).

When the corresponding data object is not found within the DST execution unit set, the method continues at step 634 where the processing module indicates an index discrepancy. The indicating includes at least one of indicating an identifier of the index, indicating identifier of the index entry, including a dispersed storage network address of the data object that is not stored in the DST execution unit set, issuing an error message, updating the list, and recovering the data object using another means.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc., described with reference to one or more of the embodiments discussed herein. Further, from figure to figure, the embodiments may incorporate the same or similarly named functions, steps, modules, etc., that may use the same or different reference numbers and, as such, the functions, steps, modules, etc., may be the same or similar functions, steps, modules, etc., or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more storage units (SUs) of a dispersed storage network (DSN), the method comprises:
   identifying, by a storage unit (SU) of the one or more SUs, a first storage format for a set of encoded data slices (EDSs) stored in a first DSN memory, wherein a data object is segmented into a plurality of data segments, and wherein a data segment of the plurality of data segments is dispersed error encoded in accordance with dispersed error encoding parameters to produce the set of encoded data slices (EDSs);
   determining to migrate the set of EDSs from the first storage format to a second storage format;
   selecting the second storage format for the set of EDSs;
   selecting a second DSN memory for the set of EDSs, wherein the second DSN memory is configured to store the set of EDSs based on the second storage format;
   determining a first migration rate to be used when migrating the set of EDSs from the first DSN memory to the second DSN memory;
   migrating a first subset of the set of EDSs from the first DSN memory to the second DSN memory based on the first migration rate to store the set of EDSs within the second DSN memory based on the second storage format;
   monitoring at least one of data access request activity or data access response activity associated with at least one of the first DSN memory or the second DSN memory;
   selecting a second migration rate based on the at least one of data access request activity or data access response activity associated with the at least one of the first DSN memory or the second DSN memory; and
   migrating a second subset of the set of EDSs from the first DSN memory to the second DSN memory based on the second migration rate.

2. The method of claim 1, wherein the determining to migrate the set of EDSs from the first storage format to the second storage format is based on at least one of interpreting a request, identifying a data type, receiving new storage configuration information, detecting a storage efficiency level that compares unfavorably to a threshold level, and detecting an unfavorable performance level.

3. The method of claim 1, wherein the first DSN memory and the second DSN memory are common to the same memory device.

4. The method of claim 1, wherein the at least one of data access request activity or data access response activity is associated with at least one of rebuilding encoded data slices, writing encoded data slices, retrieving encoded data slices, listing encoded data slices, performing SU maintenance tasks and performing SU balancing tasks.

5. The method of claim 1, wherein the determining to migrate the set of EDSs from the first storage format to the second storage format is based on at least one of detecting a storage inefficiency, receiving an error message, interpreting an error message and detecting an available storage level that compares favorably to an available storage threshold level.

6. The method of claim 1, wherein the selecting the second storage format for the set of EDSs comprises at least one of:
   identifying one or more storage formats;
   estimating a level of storage performance for each of the one or more storage formats; and
   selecting the se storage format that corresponds to a favorable estimated storage performance level.

7. The method of claim 1, wherein the migrating the first subset of the set of EDSs from the first DSN memory to the second DSN memory includes retrieving the first subset of the set of EDSs from the first DSN memory using the first storage format and storing the first subset of the set of EDSs using the second storage format.

8. A computer readable storage medium comprises:
at least one memory section that stores operational instructions that, when executed by one or more processing modules of a storage unit of a dispersed storage network (DSN), causes the storage unit to:
identify a first storage format for a set of encoded data slices (EDSs) stored in a first DSN memory, wherein a data object is segmented into a plurality of data segments, and wherein a data segment of the plurality of data segments is dispersed error encoded in accordance with dispersed error encoding parameters to produce the set of encoded data slices (EDSs);
determine to migrate the set of EDSs from the first storage format to a second storage format;
select the second storage format for the set of EDSs;
select a second DSN memory for the set of EDSs, wherein the second DSN memory is configured to store the set of EDSs based on the second storage format;
determine a first migration rate to be used when migrating the set of EDSs from the first DSN memory to the second DSN memory;
migrate a first subset of the set of EDSs from the first DSN memory to the second DSN memory based on the first migration rate to store the set of EDSs within the second DSN memory based on the second storage format;
monitor at least one of data access request activity or data access response activity associated with at least one of the first DSN memory or the second DSN memory;
select a second migration rate based on the at least one of data access request activity or data access response activity associated with the at least one of the first DSN memory or the second DSN memory; and
migrate a second subset of the set of EDSs from the first DSN memory to the second DSN memory based on the second migration rate.

9. The computer readable storage medium of claim 8 further comprises:
the at least one memory section stores further operational instructions that, when executed by the one or more processing modules, causes the one or more storage units of the DSN to:
determine to migrate the set of EDSs from the first storage format to the second storage format based on at least one of interpreting a request, identifying a data type, receiving new storage configuration information, detecting a storage efficiency level that compares unfavorably to a threshold level, and detecting an unfavorable performance level.

10. The computer readable storage medium of claim 8, wherein the first DSN memory and the second DSN memory are common to the same memory device.

11. The computer readable storage medium of claim 8, wherein the at least one of data access request activity or data access response activity comprises at least one of rebuilding encoded data slices, writing encoded data slices, retrieving encoded data slices, listing encoded data slices, performing SU maintenance tasks and performing SU balancing tasks.

12. The computer readable storage medium of claim 8 further comprises:
the at least one memory section stores further operational instructions that, when executed by the one or more processing modules, causes the one or more storage units of the DSN to:
determine to migrate the set of EDSs from the first storage format to the second storage format based on at least one of detecting a storage inefficiency, receiving an error message, interpreting an error message and detecting an available storage level that compares favorably to an available storage threshold level.

13. The computer readable storage medium of claim 8 further comprises:
the at least one memory section stores further operational instructions that, when executed by the one or more processing modules, causes the one or more storage units of the DSN to:
select the second storage format for the set of EDSs based on at least one of:
identifying one or more storage formats;
estimating a level of storage performance for each of the one or more storage formats; and
selecting the se storage format that corresponds to a favorable estimated storage performance level.

14. The computer readable storage medium of claim 8 further comprises:
the at least one memory section stores further operational instructions that, when executed by the one or more processing modules, causes the one or more storage units of the DSN to:
migrate the first subset of the set of EDSs from the first DSN memory to the second DSN memory by retrieving the first subset of the set of EDSs from the first DSN memory using the first storage format; and
store the first subset of the set of EDSs using the second storage format.

15. A storage unit of a group of storage units of a dispersed storage network (DSN), the storage unit comprises:
an interface;
a local memory; and
a processing module operably coupled to the interface and the local memory, wherein the processing module functions to:
identify a first storage format for a set of encoded data slices (EDSs) stored in a first DSN memory, wherein a data object is segmented into a plurality of data segments, and wherein a data segment of the plurality of data segments is dispersed error encoded in accordance with dispersed error encoding parameters to produce the set of encoded data slices (EDSs);
determine to migrate the set of EDSs from the first storage format to a second storage format;
select the second storage format for the set of EDSs;
select a second DSN memory for the set of EDSs, wherein the second DSN memory is configured to store the set of EDSs based on the second storage format;
determine a first migration rate to be used when migrating the set of EDSs from the first DSN memory to the second DSN memory;
migrate a first subset of the set of EDSs from the first DSN memory to the second DSN memory based on the first migration rate to store the set of EDSs within the second DSN memory based on the second storage format;

monitor at least one of data access request activity or data access response activity associated with at least one of the first DSN memory or the second DSN memory;

select a second migration rate based on the at least one of data access request activity or data access response activity associated with the at least one of the first DSN memory or the second DSN memory; and migrate a second subset of the set of EDSs from the first DSN memory to the second DSN memory based on the second migration rate.

16. The storage unit of claim 15, wherein the processing module further functions to:

determine to migrate the set of EDSs from the first storage format to the second storage format based on at least one of interpreting a request, identifying a data type, receiving new storage configuration information, detecting a storage efficiency level that compares unfavorably to a threshold level, and detecting an unfavorable performance level.

17. The storage unit of claim 15, wherein the first DSN memory and the second DSN memory are common to the same memory device.

18. The storage unit of claim 15, wherein the at least one of data access request activity or data access response activity comprises at least one of rebuilding encoded data slices, writing encoded data slices, retrieving encoded data slices, listing encoded data slices, performing SU maintenance tasks and performing SU balancing tasks.

19. The storage unit of claim 15, wherein the processing module further functions to:

determine to migrate the set of EDSs from the first storage format to the second storage format based on at least one of detecting a storage inefficiency, receiving an error message, interpreting an error message and detecting an available storage level that compares favorably to an available storage threshold level.

20. The storage unit of claim 15, wherein the processing module further functions to:

select the second storage format for the set of EDSs based on at least one of:

identifying one or more storage formats;

estimating a level of storage performance for each of the one or more storage formats; and selecting the second storage format that corresponds to a favorable estimated storage performance level.

* * * * *